United States Patent
Weinmeister et al.

(10) Patent No.: US 10,940,786 B2
(45) Date of Patent: Mar. 9, 2021

(54) CARGO LOWERING SLIDE ASSEMBLY

(71) Applicant: ONSCENE SOLUTIONS, LLC, Fort Collins, CO (US)

(72) Inventors: Ronald L. Weinmeister, Windsor, CO (US); Eric Martin Krug, Loveland, CO (US); Timothy James Bradney, Denver, CO (US); Robert M. Clark, Centennial, CO (US)

(73) Assignee: OnScene Solutions, LLC, Fort Collins, CO (US)

( * ) Notice: Subject to any disclaimer, the term of this patent is extended or adjusted under 35 U.S.C. 154(b) by 0 days.

(21) Appl. No.: 16/881,951

(22) Filed: May 22, 2020

(65) Prior Publication Data

US 2020/0282893 A1     Sep. 10, 2020

Related U.S. Application Data

(63) Continuation-in-part of application No. 15/963,023, filed on Apr. 25, 2018, now abandoned.

(60) Provisional application No. 62/490,594, filed on Apr. 26, 2017.

(51) Int. Cl.
*B60P 1/44* (2006.01)

(52) U.S. Cl.
CPC ........... *B60P 1/4442* (2013.01); *B60P 1/4435* (2013.01); *B60P 1/4457* (2013.01); *B60P 1/4485* (2013.01)

(58) Field of Classification Search
CPC .............................. B60P 1/4435; B60P 1/4442
See application file for complete search history.

(56) References Cited

U.S. PATENT DOCUMENTS

| 4,958,979 | A | | 9/1990 | Svensson | |
|---|---|---|---|---|---|
| 5,975,830 | A | * | 11/1999 | Goodrich | B60P 1/02 414/541 |
| 6,666,643 | B1 | * | 12/2003 | Heynssens | B60P 1/4435 212/180 |
| 9,545,869 | B2 | | 1/2017 | Eidsmore | |
| 10,035,447 | B2 | | 7/2018 | Miles | |
| 2003/0091418 | A1 | * | 5/2003 | Ranken | B60P 1/4435 414/545 |
| 2005/0011701 | A1 | | 1/2005 | Schmid | |
| 2005/0058528 | A1 | | 3/2005 | Wroblewski | |
| 2007/0020076 | A1 | | 1/2007 | Heynssens | |
| 2010/0215468 | A1 | | 8/2010 | Kollewe | |
| 2010/0329831 | A1 | * | 12/2010 | Tornese | A61G 3/0254 414/544 |
| 2011/0255943 | A1 | | 10/2011 | L'Ecuyer | |
| 2016/0031354 | A1 | | 2/2016 | Miles | |

(Continued)

OTHER PUBLICATIONS

"X30—Automatic Cargo Lift System from OnScene Solutions". Published by OnScene Solutions on YouTube. Published on Apr. 23, 2018. https://www.youtube.com/watch?v=bf-0BB-hplU (Year: 2018).*

(Continued)

*Primary Examiner* — Jonathan Snelting
(74) *Attorney, Agent, or Firm* — Talus Law Group LLC

(57) ABSTRACT

The present invention is directed to properly maneuver heavy cargo to an ergonomically correct lifting height, including for equipment stored on firefighting and rescue vehicles. Mechanically and electromechanically actuated means for raising, lowering, and storing heavy equipment in, on, and around vehicles and other structures are provided.

15 Claims, 34 Drawing Sheets

(56) References Cited

U.S. PATENT DOCUMENTS

2016/0159264 A1   6/2016   Ochenkowski
2016/0368542 A1   12/2016   Taylor

OTHER PUBLICATIONS

International Preliminary Report on Patentability dated Oct. 29, 2019 issued in PCT/US18/029411.
International Search Report dated Sep. 13, 2018 issued in PCT/US18/29411.
International Search Report and Written Opinion dated Sep. 10, 2020 issued in PCT/US20/034780.
U.S. Appl. No. 15/963,023, filed Apr. 25, 2018.
U.S. Appl. No. 62/490.594, filed Apr. 25, 2017.

* cited by examiner

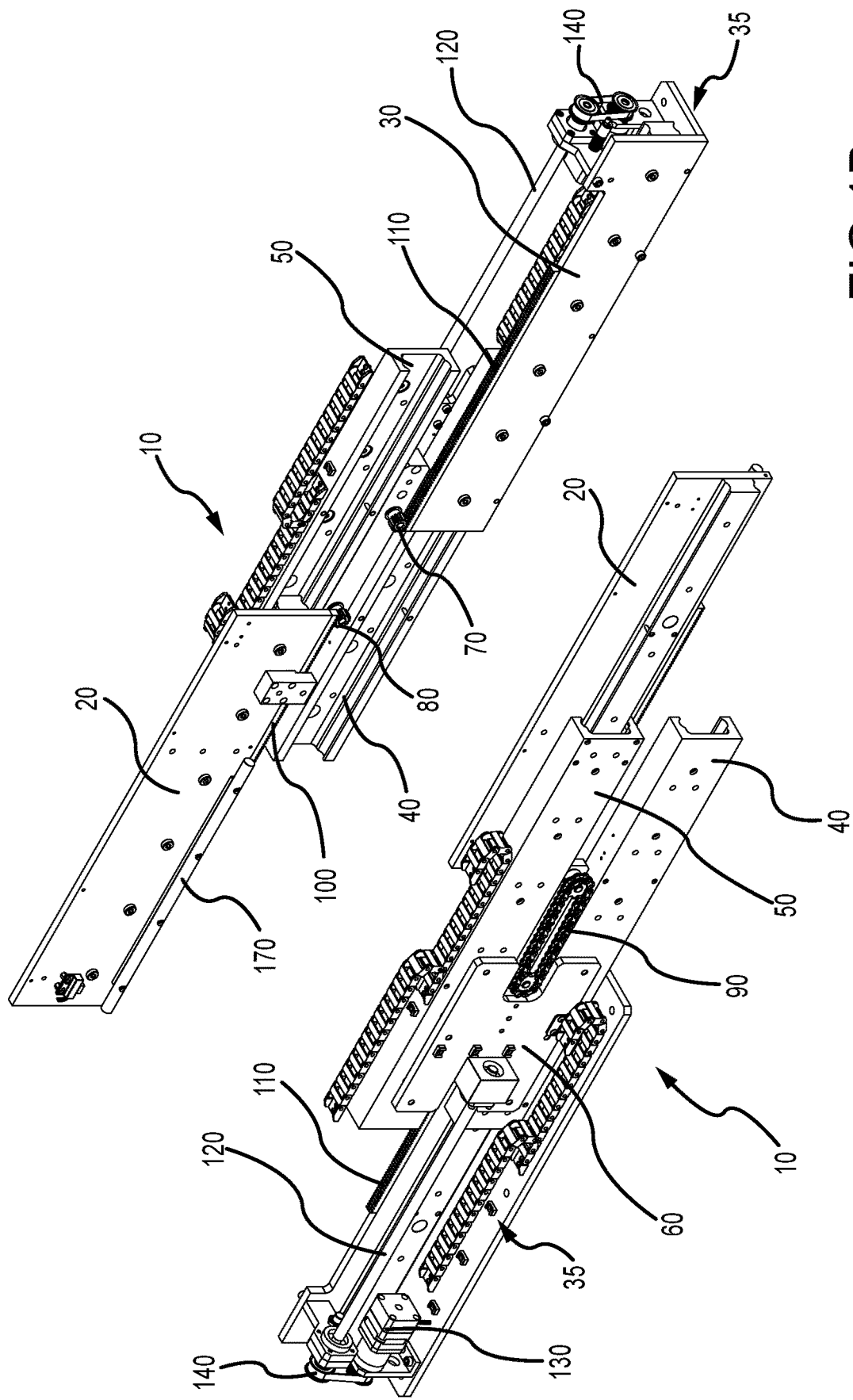

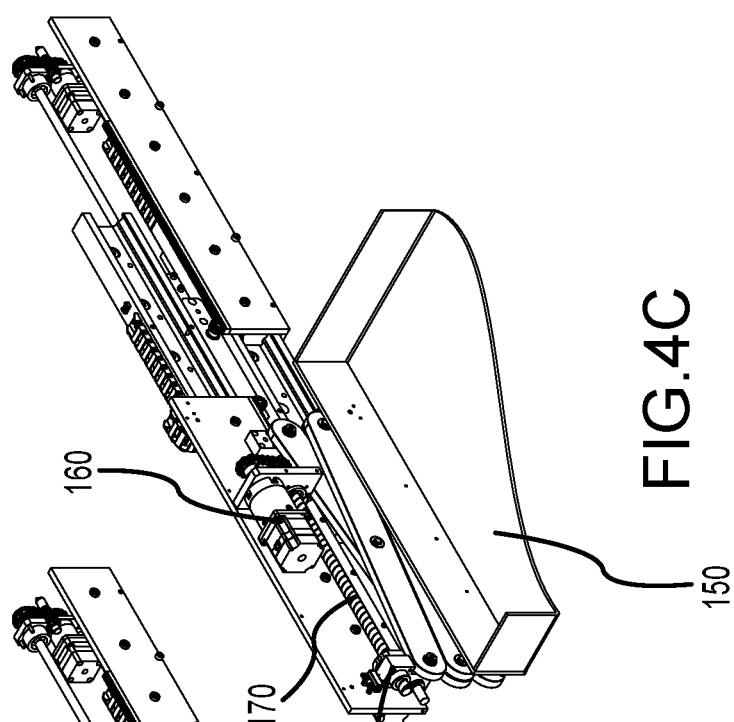
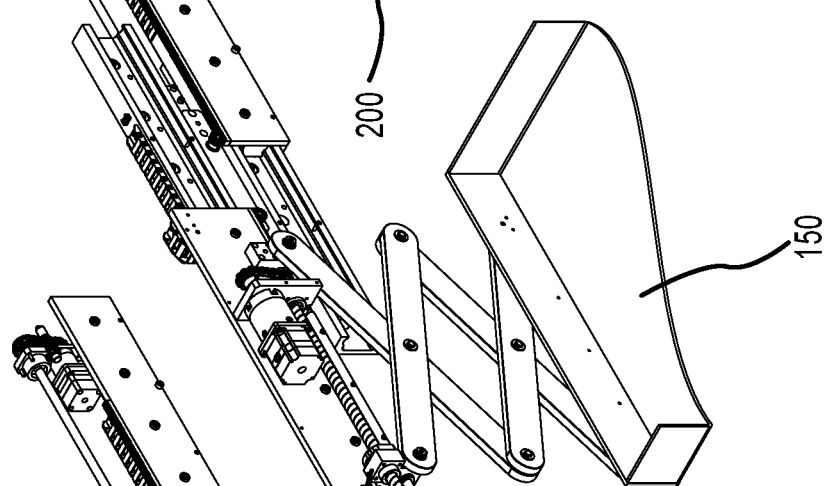
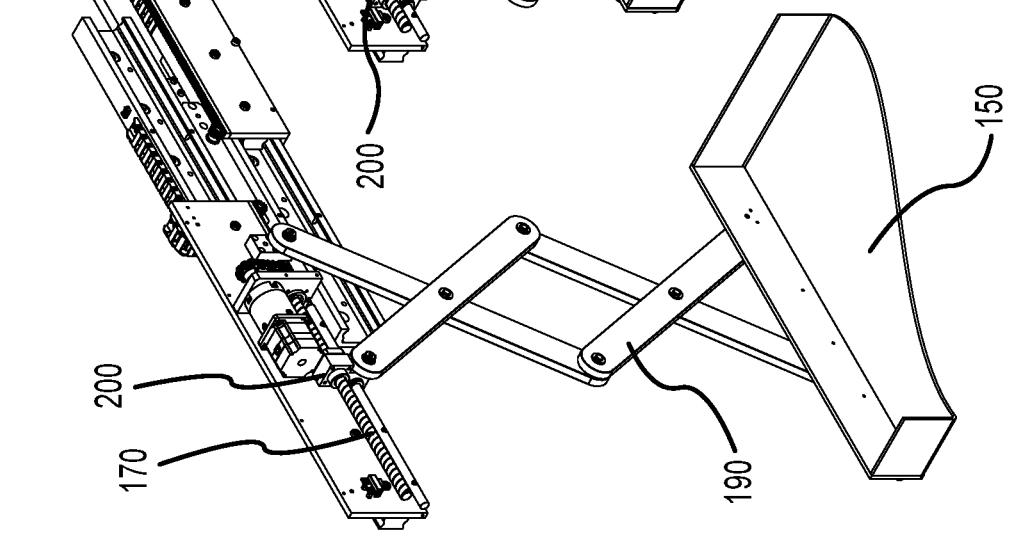
FIG. 4C
FIG. 4B
FIG. 4A

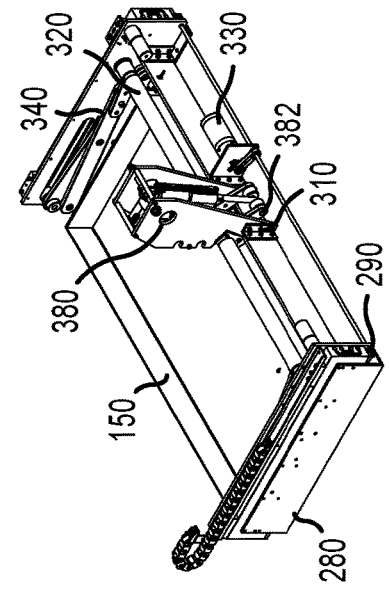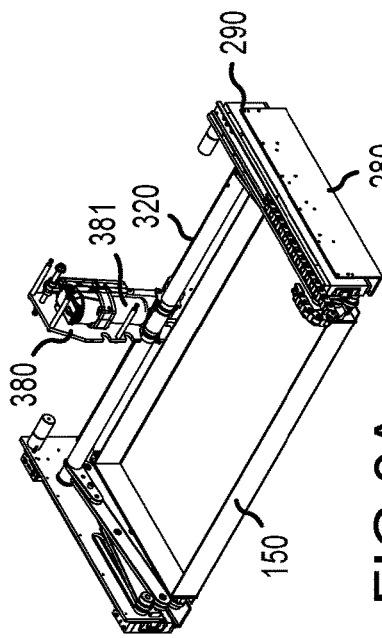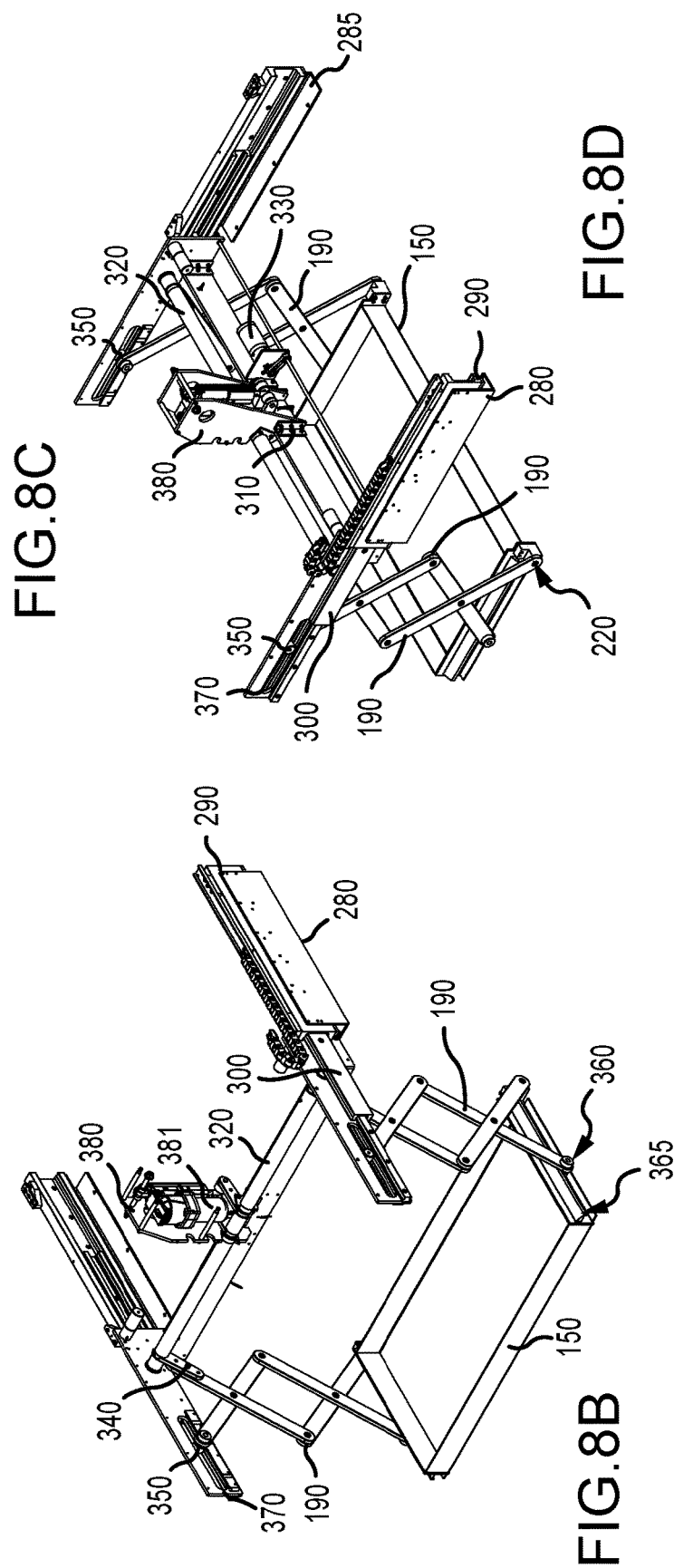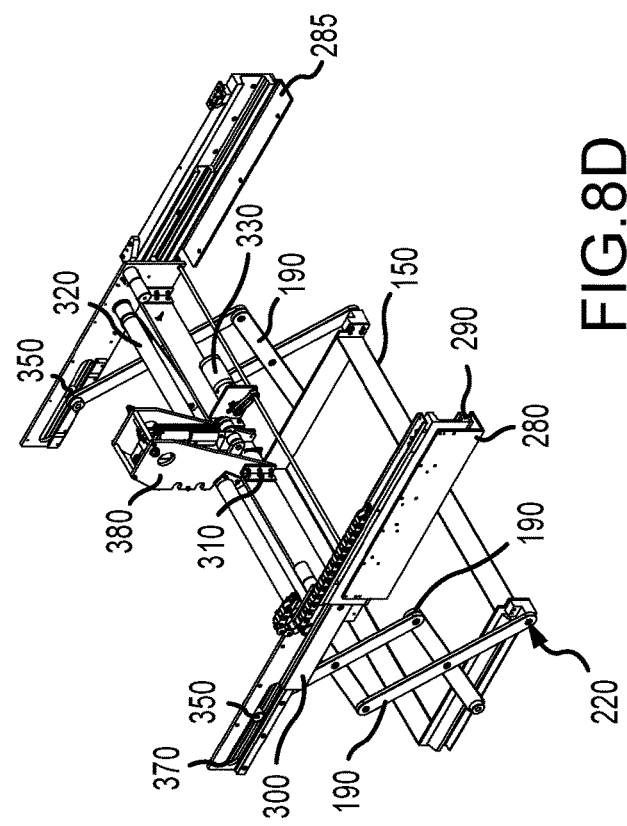

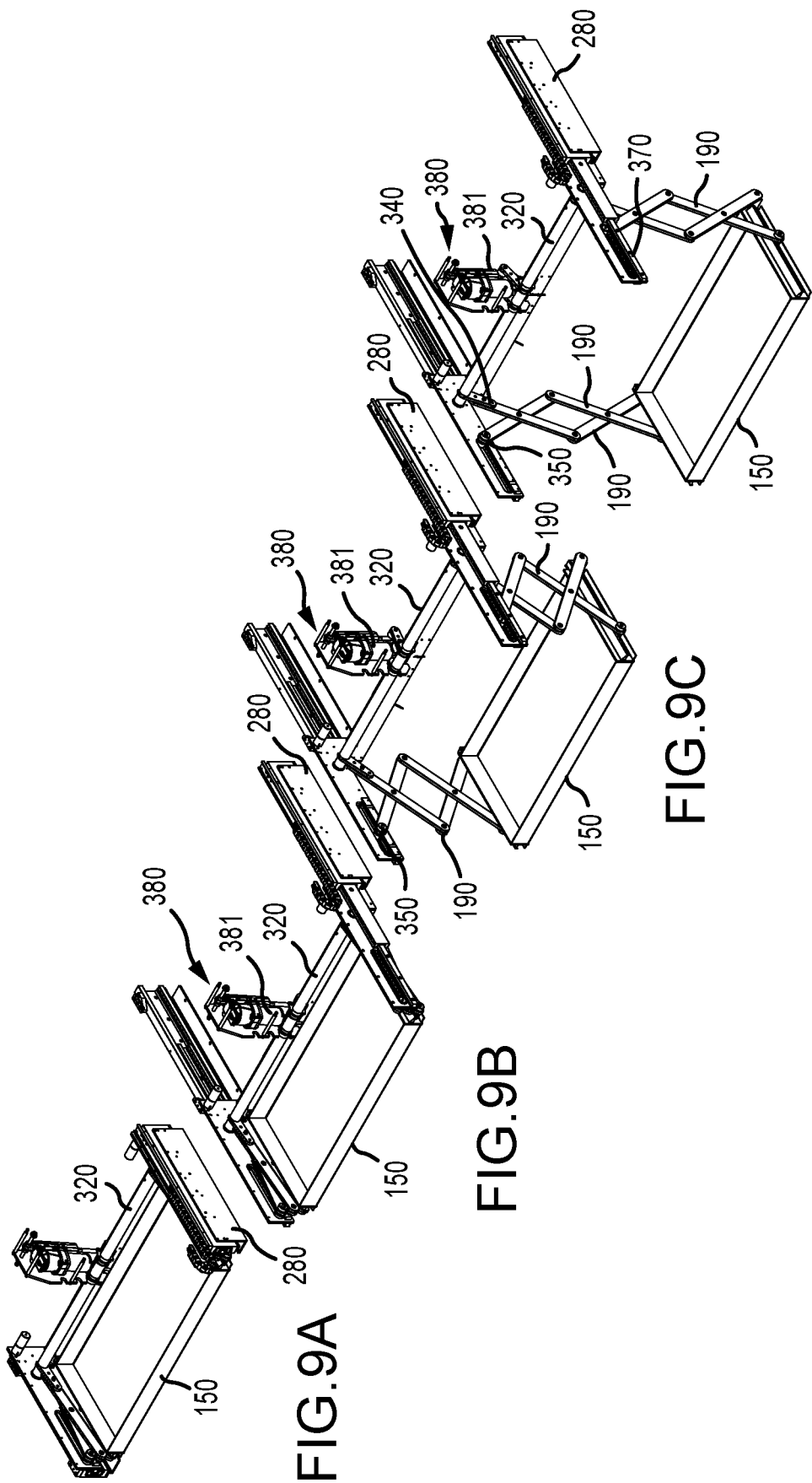

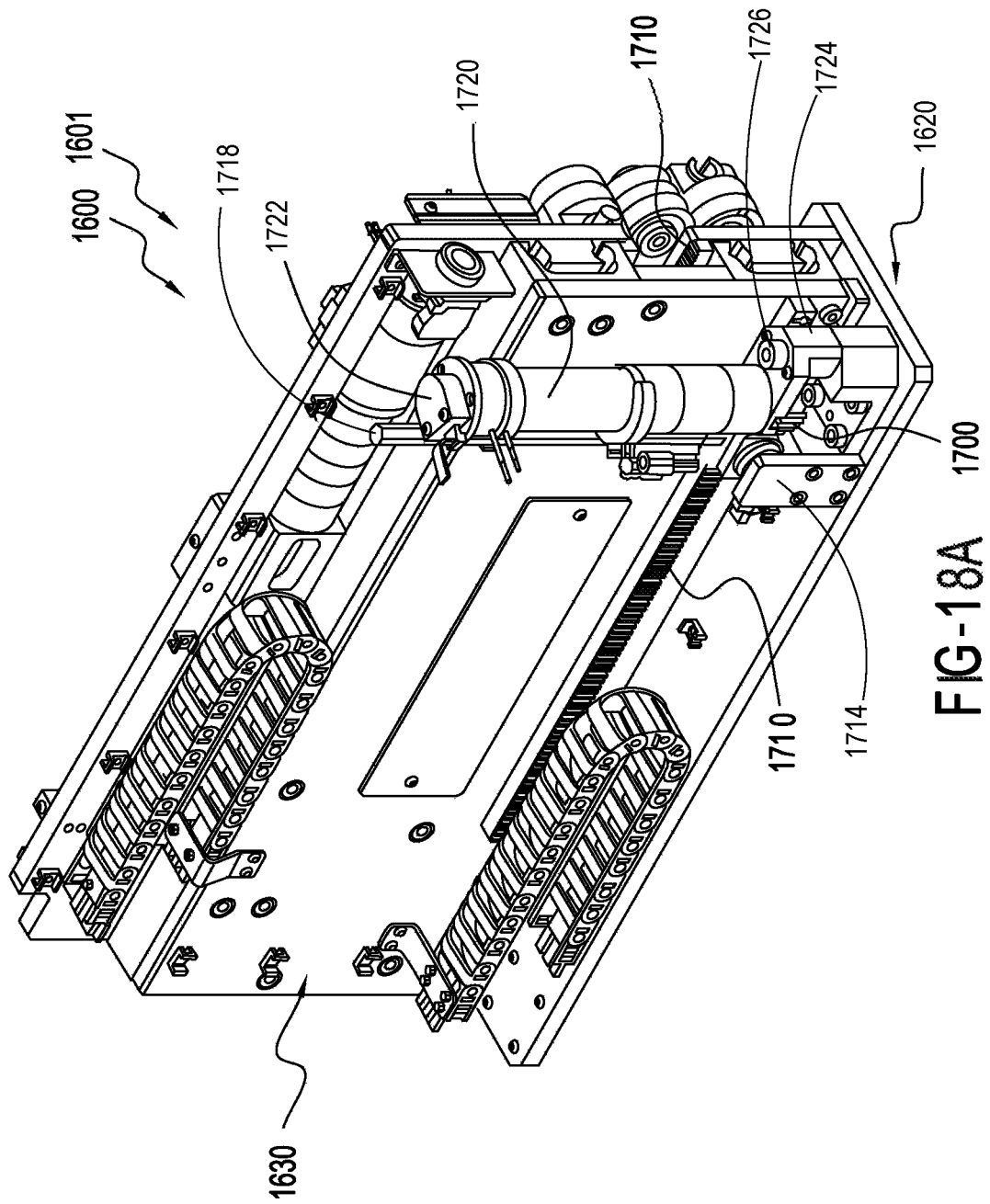

CARGO LOWERING SLIDE ASSEMBLY

CROSS REFERENCE TO RELATED APPLICATIONS

The present application is a continuation in part of U.S. patent application Ser. No. 15/963,023, filed Apr. 25, 2018, which claims the benefit of U.S. Provisional Patent Application No. 62/490,594, filed Apr. 26, 2017, entitled "Cargo Lowering Slide Assembly," all of which are incorporated by reference in their entirety.

FIELD OF THE INVENTION

The present invention is directed to the problem of how to properly maneuver heavy cargo to an ergonomically correct lifting height is a problem for countless industries, including for equipment stored on firefighting and rescue vehicles. Mechanical and electrically actuated horizontal drawer slides enable loads to be moved outside of an enclosure or storage structure for easier access. However, the height of the horizontal drawer slide is dictated by the structure of the vehicle and is often too high or too low for safe lifting of heavy cargo from the horizontal drawer slide. The user must therefore lift the heavy equipment from an awkward and potentially dangerous height and risks bodily injury.

SUMMARY OF THE INVENTION

The present invention is a cargo lowering slide assembly that achieves horizontal and extended mobility of a cargo platform from a storage compartment as well as vertical mobility of the cargo platform once outside of the storage compartment. The referenced cargo lowering slide assembly generally refers to the completed assembly of all components allowing these types of movements. The reference to a "slide assembly" is to a component of the cargo lowering slide assembly that facilitates the horizontal travel of the cargo platform.

The cargo lowering slide assembly with the features listed below, will greatly enhance cargo handling capabilities for numerous industries and allow for more ergonomically correct and safe lifting advantages over what currently exists.

In certain embodiments of the present invention, the cargo lowering slide assembly includes partial or complete electric, electric/hydraulic, or air-actuated horizontal and vertical actuation of the drawer slide and lifting arms; 30.0+ inches of vertical lifting cargo platform travel; 500 pound and above weight capacity; construction materials including aluminum and stainless steel construction; and customizable sizing to accommodate various enclosure and cargo platform sizes.

Certain embodiments of the present invention comprise one or more components that are automatically controlled by computer hardware and/or computer software by way of a controller element. In an exemplary embodiment, the positioning and/or orientation of one or more components are automatically positioned to a set orientation based on a profile inputted by a manufacturer or user. Alternatively, or additionally, the controller may access a database of user profiles, and/or set generic user profiles, and adjust the cargo lowering slide assembly to satisfy those profiles. In certain embodiments, the user inputs desired cargo platform extension and lowering position or settings by way of a display, screen or graphical user interface.

The present disclosure can provide a number of advantages depending on the particular aspect, embodiment, and/or configuration.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a computer-readable medium is commonly tangible, non-transitory, and non-transient and can take many forms, including but not limited to, non-volatile media, volatile media, and transmission media and includes without limitation random access memory ("RAM"), read only memory ("ROM"), and the like. Nonvolatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all the equivalents thereof. Further, the structures, materials or acts and the equivalents thereof shall include all those described in the summary, brief description of the drawings, detailed description, abstract, and claims themselves.

The term "module" as used herein refers to any known or later developed hardware, software, firmware, artificial intelligence, fuzzy logic, or combination of hardware and software that can perform the functionality associated with that element.

The term "screen," "touch screen," or "touchscreen" refers to a physical structure that includes one or more hardware components that provide the device with the ability to render a user interface and/or receive user input. A screen can encompass any combination of gesture capture region, a touch sensitive display, and/or a configurable area. The device can have one or more physical screens 3 embedded in the hardware. However, a screen may also include an external peripheral device that may be attached and detached from the device. In embodiments, multiple external devices may be attached to the device. Thus, in embodiments, the screen can enable the user to interact with the device by touching areas on the screen and provides information to a user through a display. The touch screen may sense user contact in many ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "display" refers to a portion of one or more screens used to display the output of a computer to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future developed standard, instruction set, libraries, and/or architecture.

Certain embodiments of the present invention comprise wireless communication hardware such as Wi-Fi, Bluetooth®, Zigbee®, or other wireless communication protocol enabling hardware known to those skilled in the art.

Certain embodiments of the present invention comprise onboard monitoring for maintenance, technical support and other purposes wherein notifications are output to users, technical support staff, and/or other stakeholders associated with the cargo lowering slide assembly as necessary.

Furthermore, while the exemplary aspects, embodiments, and/or configurations illustrated herein show the various components of the system collocated, certain components of the system may be located remotely, at distant portions of a distributed network, such as a LAN and/or the Internet, or within a dedicated system. Thus, it should be appreciated, that the components of the system may be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire and fiber optics, and may take the form of acoustic or light waves, such as those generated during radio-wave and infra-red data communications.

Also, while the orders of operation have been discussed and illustrated in relation to a particular sequence of events, it should be appreciated that changes, additions, and omissions to this sequence may occur without materially affecting the operation of the disclosed embodiments, configuration, and aspects.

A number of variations and modifications of the disclosure may be used. It would be possible to provide for some features of the disclosure without providing others.

In other embodiments, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

In other embodiments, the disclosed methods may be readily implemented in conjunction with software using object or object-oriented software development environments that provide portable source code that may be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In other embodiments, the disclosed methods may be partially implemented in software that may be stored on a storage medium, executed on programmed general-purpose computer with the cooperation of a controller and memory, a special purpose computer, a microprocessor, or the like. In these instances, the systems and methods of this disclosure may be implemented as program embedded on personal computer such as an applet, JAVA® or CGI script, as a resource residing on a server or computer workstation, as a routine embedded in a dedicated measurement system, system component, or the like. The system may also be implemented by physically incorporating the system and/or method into a software and/or hardware system.

The preceding is a simplified summary of the disclosure to provide an understanding of some aspects of the disclosure. This Summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

The Description of the invention, the drawing figures, and any exemplary claim set forth herein, taken in conjunction with this Summary of the invention, define the invention.

BRIEF DESCRIPTION OF THE DRAWINGS

FIG. 1A—depicts a first side of the slide assembly in an extended position of certain embodiments.

FIG. 1B—depicts a second side of the slide assembly in an extended position of certain embodiments.

FIG. 4A—depicts a side of the slide assembly with interconnected scissor arms and cargo platform in retracted, intermediate, and extended positions of a cargo lowering slide assembly showing in certain embodiments.

FIG. 4B—depicts a side of the slide assembly with interconnected scissor arms and cargo platform in retracted, intermediate, and extended positions of a cargo lowering slide assembly showing in certain embodiments.

FIG. 4C—depicts a side of the slide assembly with interconnected scissor arms and cargo platform in retracted, intermediate, and extended positions of a cargo lowering slide assembly showing in certain embodiments.

FIG. 8A—depicts certain embodiments of a cargo lowering slide assembly showing a first side of the slide assembly with interconnected scissor arms and cargo platform in a retracted.

FIG. 8B—depicts certain embodiments of a cargo lowering slide assembly showing a first side of the slide assembly with interconnected scissor arms and cargo platform in an intermediate position.

FIG. 8C—depicts certain embodiments of a cargo lowering slide assembly showing a second side of the slide assembly with interconnected scissor arms and cargo platform in a retracted position.

FIG. 8D—depicts certain embodiments of a cargo lowering slide assembly showing a side of the slide assembly with interconnected scissor arms and cargo platform in an intermediate position.

FIG. 9A—depicts certain embodiments of a cargo lowering slide assembly showing a side of the slide assembly with interconnected scissor arms and cargo platform in a horizontally retracted or fully stowed position.

FIG. 9B—depicts certain embodiments of a cargo lowering slide assembly in an extended configuration showing a side of the slide assembly in an extended position with interconnected scissor arms and cargo platform in a retracted or raised position.

FIG. 9C—depicts certain embodiments of a cargo lowering slide assembly in an intermediate configuration showing a side of the slide assembly in an extended position with interconnected scissor arms and cargo platform in an intermediate position.

FIG. 9D—depicts certain embodiments of a cargo lowering slide assembly in a fully deployed configuration showing a side of the slide assembly in an extended position with interconnected scissor arms and cargo platform in a lowered configuration.

FIG. 18A—an isometric view of certain embodiments comprising a first slide assembly in a fully stowed configuration.

FIG. 18D—a first side view of certain embodiments comprising a first slide assembly in a fully stowed configuration.

FIG. 18E—a first side view of certain embodiments comprising a first slide assembly in an extended configuration and raised configuration.

FIG. 18F—a second side view of certain embodiments comprising a first slide assembly in an extended configuration and raised configuration.

FIG. 18G—a second side view of certain embodiments comprising a first slide assembly in an extended configuration and lowered configuration.

DETAILED DESCRIPTION OF VARIOUS EMBODIMENTS

Figures 2A, 2B:
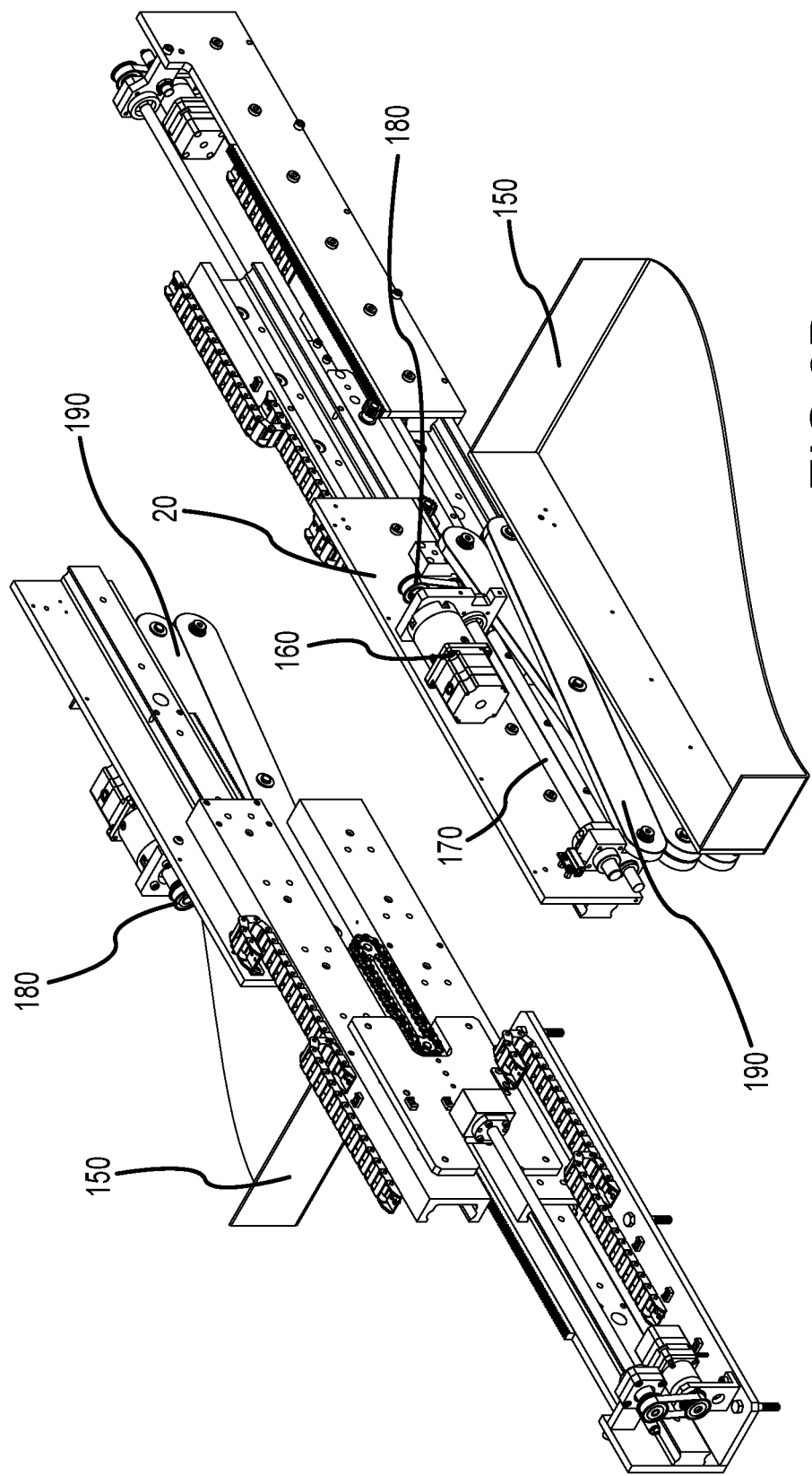
FIG. 2A—depicts a cargo lowering slide assembly of certain embodiments showing a first side of a slide assembly in an extended position with interconnected scissor arms and cargo platform in a retracted or lifted position.
FIG. 2B—depicts a cargo lowering slide assembly of certain embodiments showing a second side of a slide assembly in an extended position with interconnected scissor arms and cargo platform in a retracted or lifted position.

The cargo lowering slide assembly generally comprises two drawer slide assemblies 10, two scissor arm assemblies 190, and a cargo platform 150, as seen in FIGS. 1-15. The cargo lowering slide assembly is adapted to be mounted within an enclosure 250, but may also be mounted to a surface that is not enclosed such as on the top of a vehicle or in the bed of a pickup truck.

As seen in FIGS. 5-7 and 10-12, the enclosure 250 may be any enclosure suitable for storing cargo, but generally includes three side walls, a top, a bottom, and a door opening 260. The door opening of certain embodiments include a door 265 such as a tip up door (FIG. 10B-FIG. 10C), a sliding door, or a roll up door (FIG. 10D). The enclosure may be attached or integrated into the body or chassis of a vehicle (not shown) such as a firetruck or emergency response vehicle.

In certain embodiments the cargo lowering slide assembly, the slide assembly 10, as shown in FIGS. 1-7, is generally comprised of elements 20 through 140. Lower slide plate 30 includes a foot 35 for mounting the slide assembly to the bottom of the enclosure 250 or to another surface. The lower slide plate 30 is slideably engaged with lower slide sleeve 40. In certain embodiments, the slideable engagement comprises ball bearings. Lower slide sleeve 40 is interconnected to upper slide sleeve 50 by bridge 60. Upper slide sleeve 50 is slideably engaged with upper slide plate 20. In certain embodiments, the slideable engagement comprises ball bearings. Lower rack gear 110 is interconnected to the top edge of lower slide plate 30, and upper rack gear 100 is interconnected to the bottom edge of upper slide plate 20. The slide assembly 10 of certain embodiments includes additional slide plates, slide sleeves, and bridges to increase the overall extended length of the slide assembly.

Other embodiments of the slide assembly are shown in FIGS. 8-15. The slide assembly includes an outer slide rail 280, a middle slide rail 290, and an inner slide rail 300 in a nested configuration. In certain embodiments, the outer slide rail 280 and middle slide rail 290 are slideably engaged by ball bearings, and the middle slide rail 290 and inner slide rail are slideably engaged by ball bearings. Outer slide rail 280 is interconnected to a foot 285 for mounting the slide assembly to the bottom of the enclosure 250 or to another surface. A spur gear 338 (seen in FIG. 14) is interconnected to the bottom edge of outer slide rail. In certain embodiments, inner slide rail 300 is interconnected to a slide plate similar to the upper slide plate 20 (FIG. 1). The slide plates of opposing slide assemblies may be interconnected by a beam for increased structural rigidity. The slide assembly of certain embodiments includes additional slide rails to increase the overall extended length of the slide assembly.

In certain embodiments, seen in FIGS. 1-7, slide assembly 10 is extended or contracted horizontally to move the cargo platform 150 by use of extension motor assembly 130, extension timing belt assembly 140, and extension screw 120. The motor assembly 130 is rotatively interconnected with the extension screw 120, by the extension timing belt assembly 140. Activation of extension motor assembly 130 causes rotation of extension screw 120 that, in turn, converts rotation through a threaded bushing into linear thrust which is applied simultaneously to the bridge 60, the upper slide sleeve 50, and the lower slide sleeve 40. The motion of the lower slide sleeve 40 is coupled directly to the motion of the lower spur gear 70, wherein linear motion of the lower slide sleeve 40 results in linear motion of the lower spur gear 70. The lower spur gear 70 is rotatively engaged with the lower rack gear 110, wherein linear motion of the lower spur gear 70 in relation to the lower rack gear 110, results in the rotation of the lower spur gear 70. Rotation of lower spur gear 70 against the fixed lower rack gear 110 causes lower slide sleeve 40 to extend or contract relative to lower slide plate 30. In turn, the lower spur gear 70 which is interconnected to upper spur gear 80 by synchronizer chain 90. Rotation of the lower spur gear 70 therefore causes rotation of upper spur gear against upper rack gear 100 and causes upper slide plate 20 to extend or contract relative to upper slide sleeve 50. The synchronizer chain 90 causes relatively simultaneous rotation of lower spur gear 70 and upper spur gear 80 and therefore the extension and contraction of the upper and lower portions of slide assembly 10 is synchronized and amplified. In certain embodiments, the slide assembly 10 can be extended or contracted by use of a drive belt/pulley or drive chain/sprocket assembly, interconnected by mechanical fasteners, welding or by use of adhesive to the rails. Embodiments of the present invention achieve horizontal actuation by utilizing a ball screw/actuator or gearbox assembly or by an air assist type actuator that is interconnected to the slide rails and that extends and returns the slide assembly 10 to an extended or contracted position. In certain embodiments, the cargo lowering slide assembly may also include latches, pins, magnets, solenoids, springs, or other known interference devices for mechanically preventing movement of the cargo lowering slide assembly when in stored, extended, or lowered positions, as well as proximity sensors to electronically monitor and prevent movement of the cargo lowering slide assembly when in stored, extended, or lowered positions.

Figure 14:
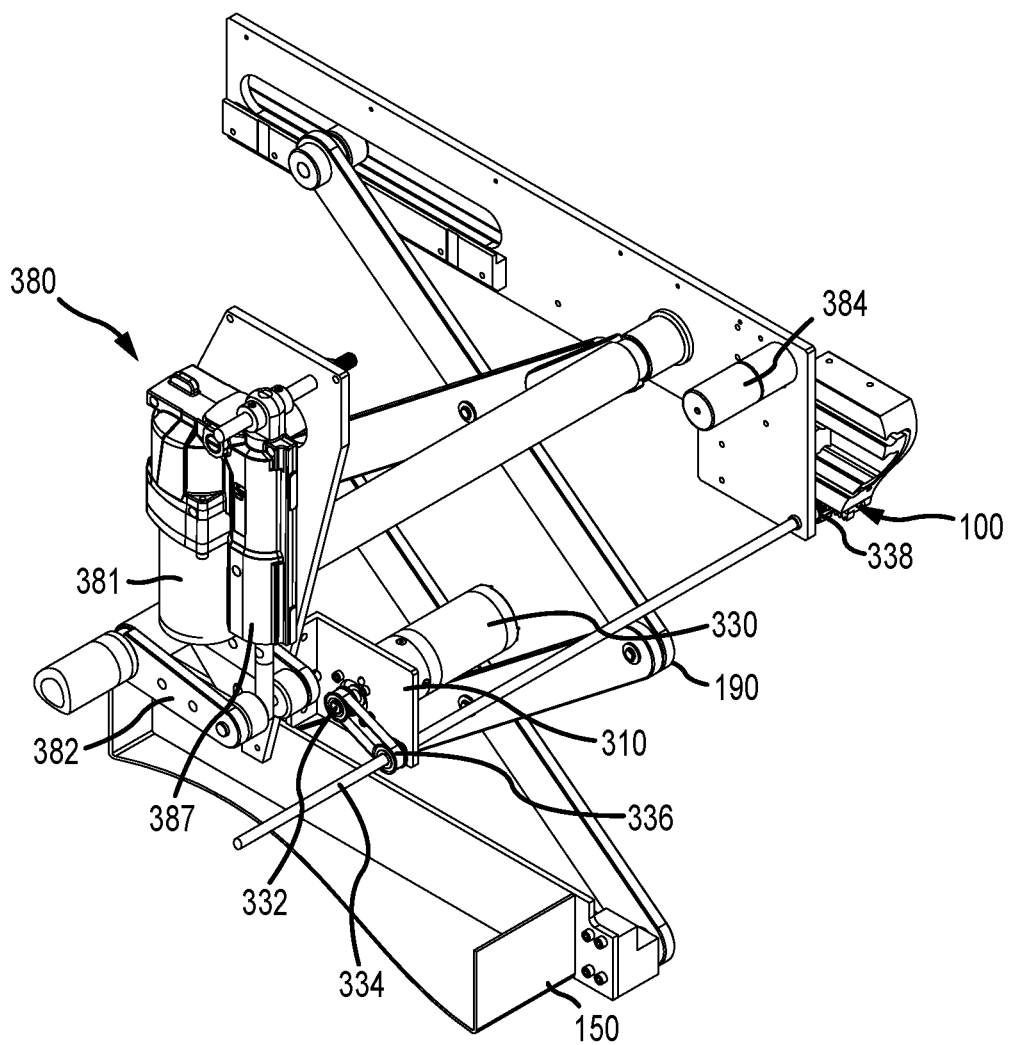
FIG. 14—depicts the scissor arm configuration in certain embodiments showing a second side portion of the actuator devices.
Figure 15:
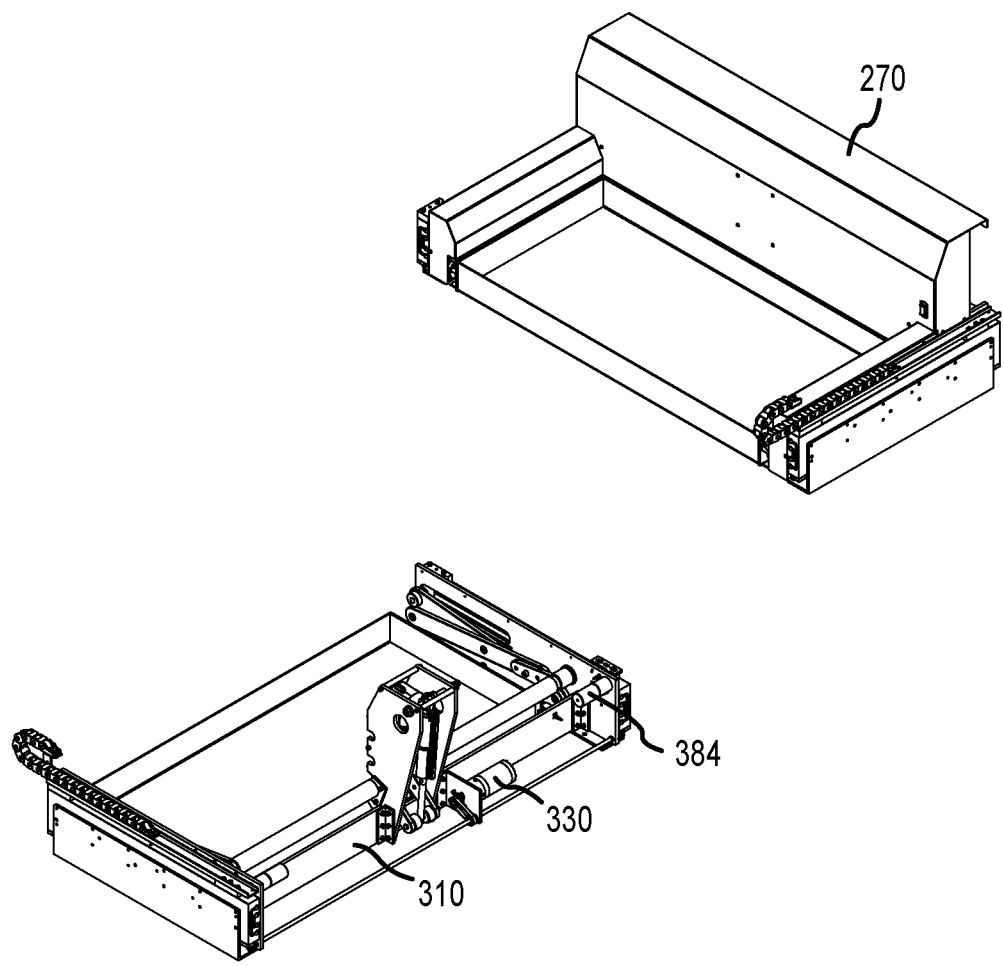
FIG. 15—depicts certain embodiments of the cargo lowering slide assembly.

In other embodiments, seen in FIGS. 14 and 15, the slide assembly is extended or contracted horizontally to move the cargo platform by use of rack drive assembly. The rack drive assembly includes a motor 330 and pulley 332 and is interconnected to a pulley on a rack drive rod 334 by a belt or chain 336. Activation of the rack drive assembly motor 384 causes rotation of the rack drive rod 334 which, in turn, rotates a spur gear 338 that is engaged with the rack gear 100 interconnected to the bottom edge of upper slide plate 20. Rotation of spur gear against the fixed rack gear causes the middle and inner slide rails to extend or contract relative to outer slide rail. The slide assembly could also be extended or contracted by use of a drive belt/pulley, drive chain/sprocket, or hydraulic piston assembly, interconnected by mechanical fasteners, welding or by use of adhesive to the rails.

Figure 3B:
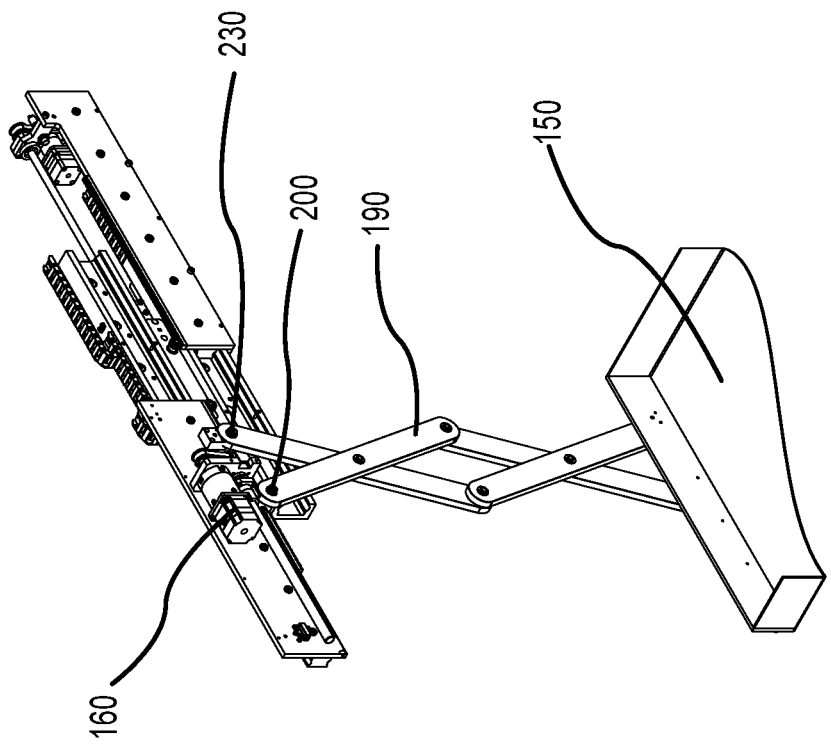
FIG. 3B—depicts a second side of the drawer slide with interconnected scissor arms and cargo platform in an extended or lowered position in certain embodiments of a cargo lowering slide assembly.
Figure 3A:
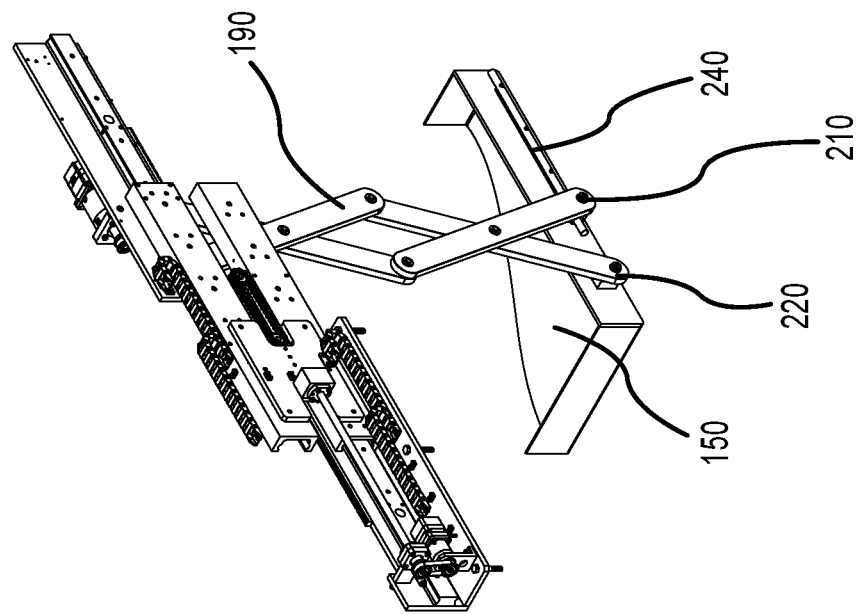
FIG. 3A—depicts a first and second side of the drawer slide with interconnected scissor arms and cargo platform in an extended or lowered position in certain embodiments of a cargo lowering slide assembly.
Figure 5:
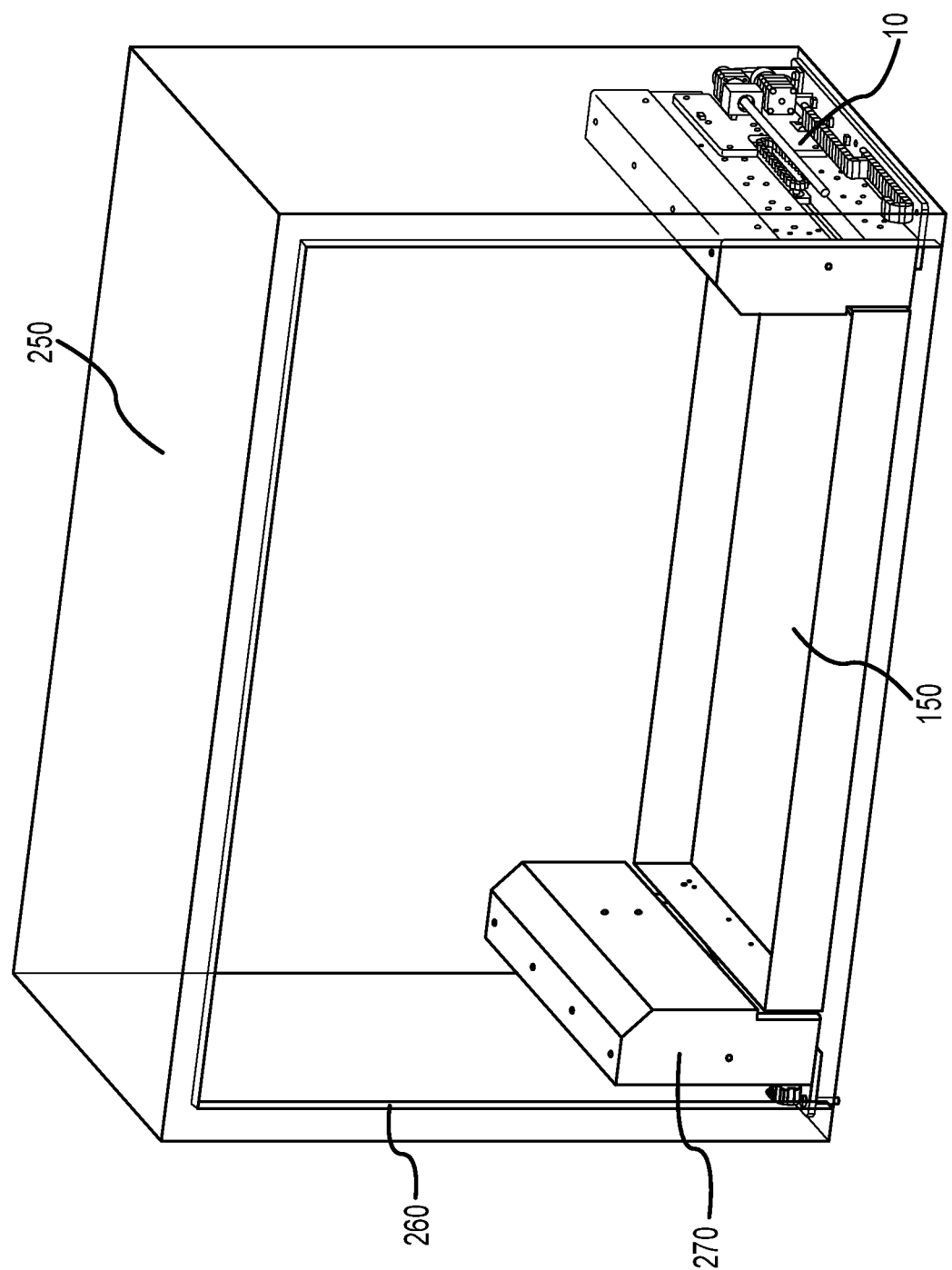
FIG. 5—depicts certain embodiments of cargo lowering slide assembly in a horizontally retracted position with the cargo platform within a storage compartment or enclosure.
Figure 6:
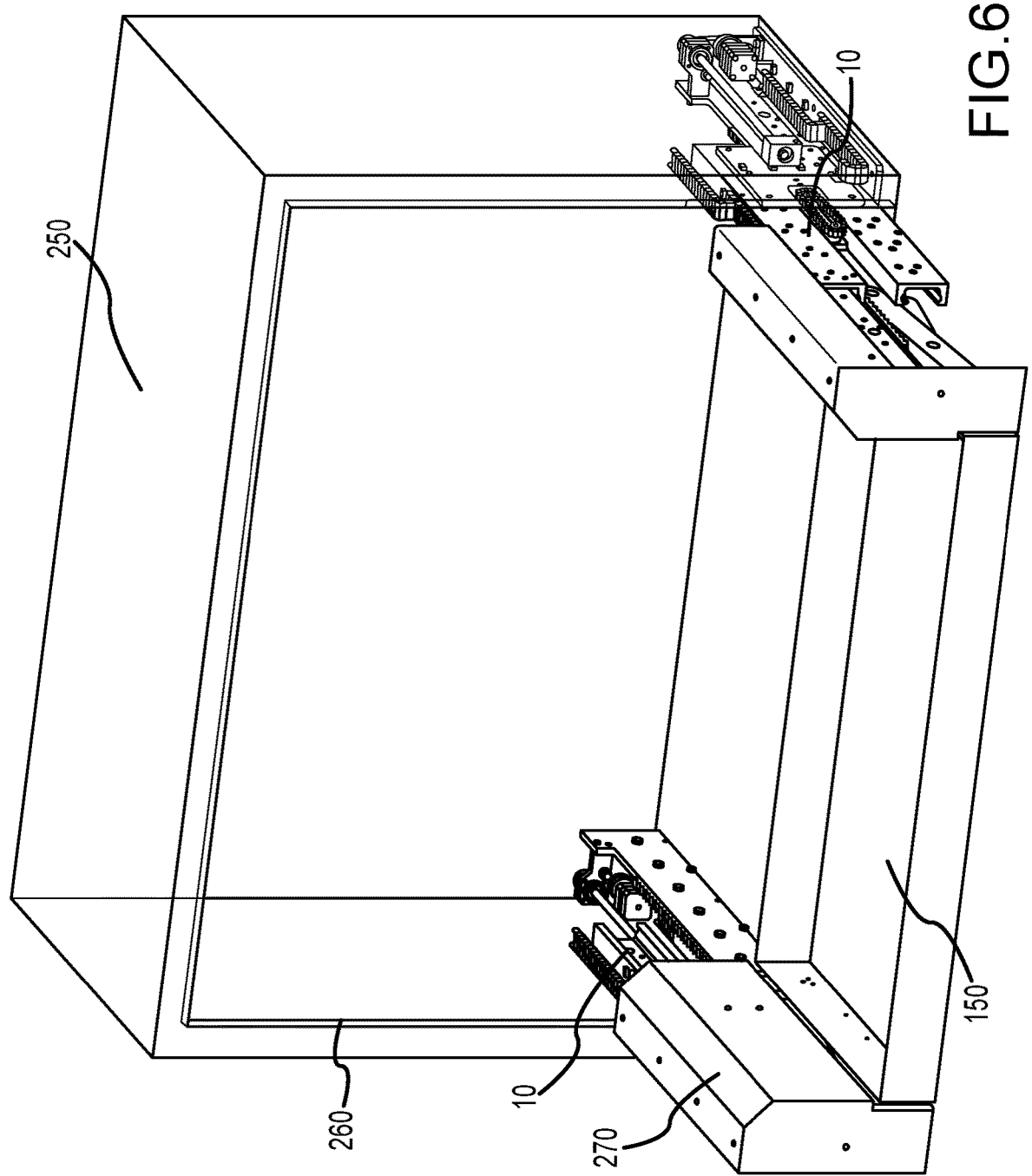
FIG. 6—depicts certain embodiments of the cargo lowering slide assembly with the cargo platform in a horizontally extended position outside of the storage compartment or enclosure.
Figure 7:
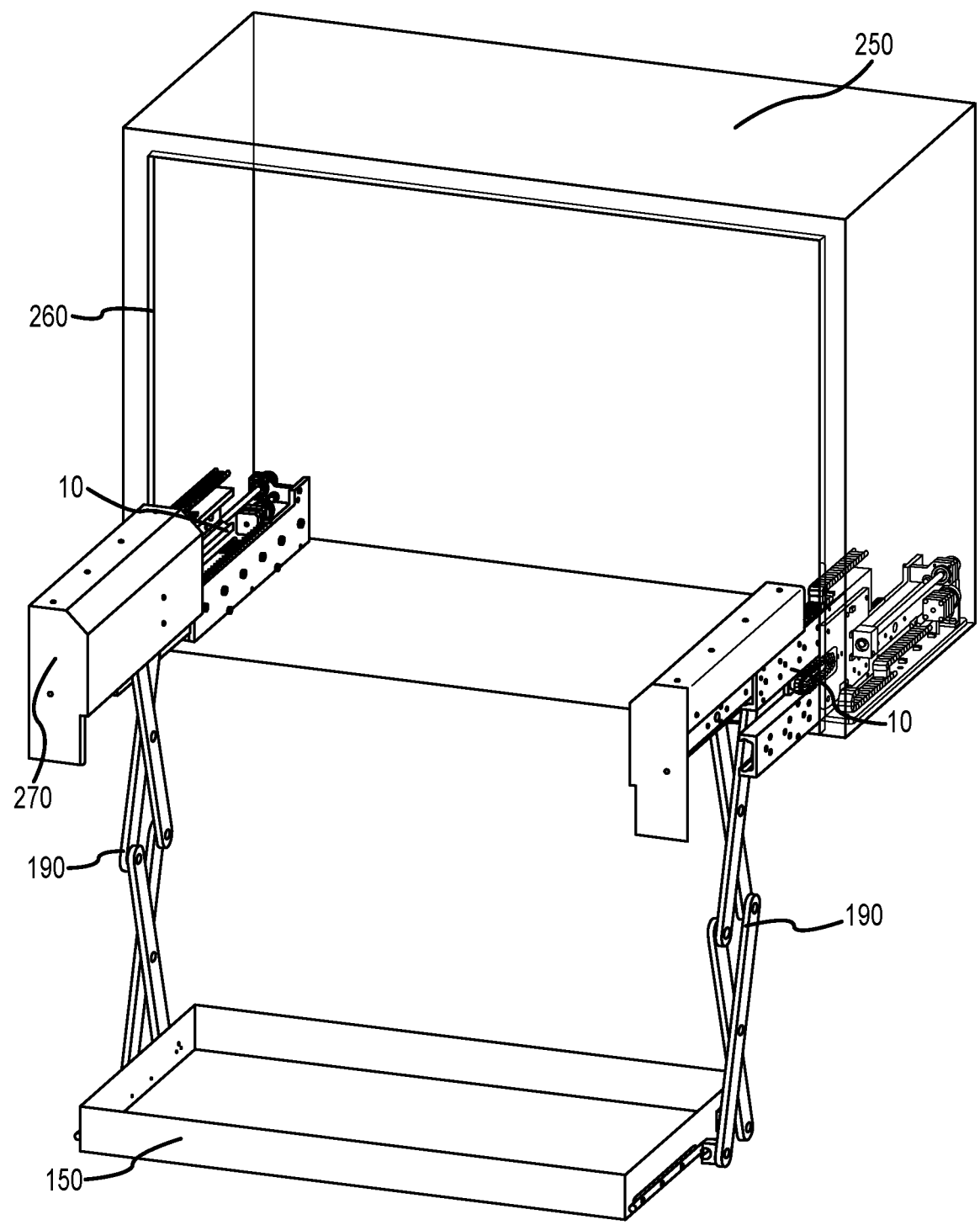
FIG. 7—depicts certain embodiments of a cargo lowering slide assembly with the cargo platform in a horizontally extended and vertically lowered position outside of the storage compartment or enclosure.

In certain embodiments, as seen in FIGS. 2-4, the lower ends of scissor arm assemblies 190 are interconnected to opposite sides of the cargo platform 150 by lower scissor pivot 220 and lower pillow block assembly 210. Cargo platform guide 240 is interconnected to the cargo platform 150 and lower pillow block assembly 210 is slideably engaged to cargo platform guide 240. The upper ends of scissor arm assemblies 190 are interconnected to respective slide assemblies 10 at upper scissor pivot 230 and upper bushing assembly 200. Certain embodiments comprise upper bushing assembly 200 threadably interconnected to scissor screw 170. The cargo platform 150 is extended or contracted vertically by use of scissor motor assembly 160, scissor timing belt assembly 180, and scissor screw 170. Scissor timing belt assembly 180 transfers rotation of scissor motor assembly 160 to scissor screw 170. In turn, rotation of scissor screw 170 causes upper bushing assembly 200 to travel outward or inward depending upon the direction of rotation of scissor screw 170. Movement of upper bushing assembly 200 relative to upper scissor pivot 230 causes the scissor arm assembly 190 to extend or contract in a scissor motion. Extension or contraction of the scissor arm assembly 190 may also be achieved with a series of cables and pulleys, screws, or by hydraulic actuation. The cargo platform 150 may also be raised or lowered using telescopic actuation. In other embodiments, cargo platform 150 may be raised or lowered using rods, telescoping mechanisms, hydraulic pistons, treaded rods with nuts, a plurality of screws and bushings or hydraulic cylinders or any combination of mechanisms to raise and lower a platform. As seen in FIGS. 5, 6, 10, 11, 12, and 15, the scissor arm and slide assemblies can be covered by a shroud 270, in certain embodiments when in a retracted position.

In certain embodiments, seen in FIGS. 8A-9D the lower ends of scissor arm assemblies 190 are interconnected to opposite sides of the cargo platform 150 by a lower scissor pivot 220 and a lower roller 360. The roller is slideably engaged with a channel 365 attached to the cargo platform 150. The upper ends of scissor arm assemblies 190 are interconnected to respective slide assemblies at a scissor shaft 320 and an upper roller 350. The upper roller 350 is slideably engaged with a channel 370 integrated into the slide plate. The first end of a lever arm 382 is affixed to the scissor shaft 320 near the middle of the scissor shaft length. As seen in FIGS. 8, 9, 13, and 14 a scissor actuator assembly 380 including a hydraulic piston 381 is interconnected to the scissor shaft 320. The arm of the piston 387 is rotatably interconnected to the second end of the lever arm 382. The extension or retraction of the piston arm 387 acts upon the second end of the lever arm, resulting in the rotation of the lever arm 382 about the first end of the lever arm, thus causing the scissor shaft 320 to rotate. In turn, rotation of the scissor shaft 320 causes the scissor arm assembly 190 to extend or contract in a scissor motion and thereby lower or raise the cargo platform 150. A solenoid locking mechanism 384, shown in FIG. 14, can be used to keep the sliding mechanism and the extending arms in a desired position.

Figure 10A:
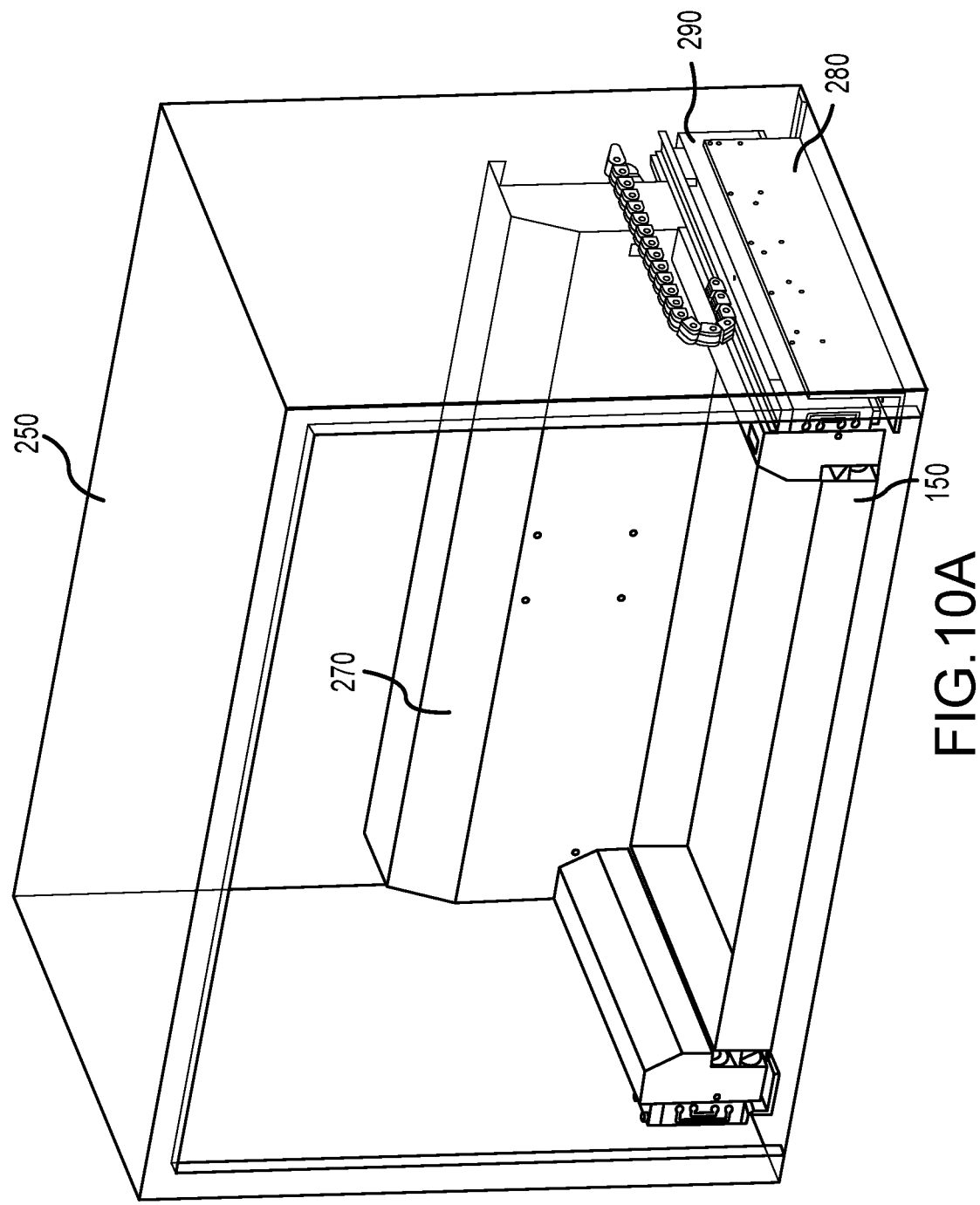
FIG. 10A—depicts certain embodiments of a cargo lowering slide assembly in a horizontally retracted position with the cargo platform within a storage compartment or enclosure.
Figure 10B:
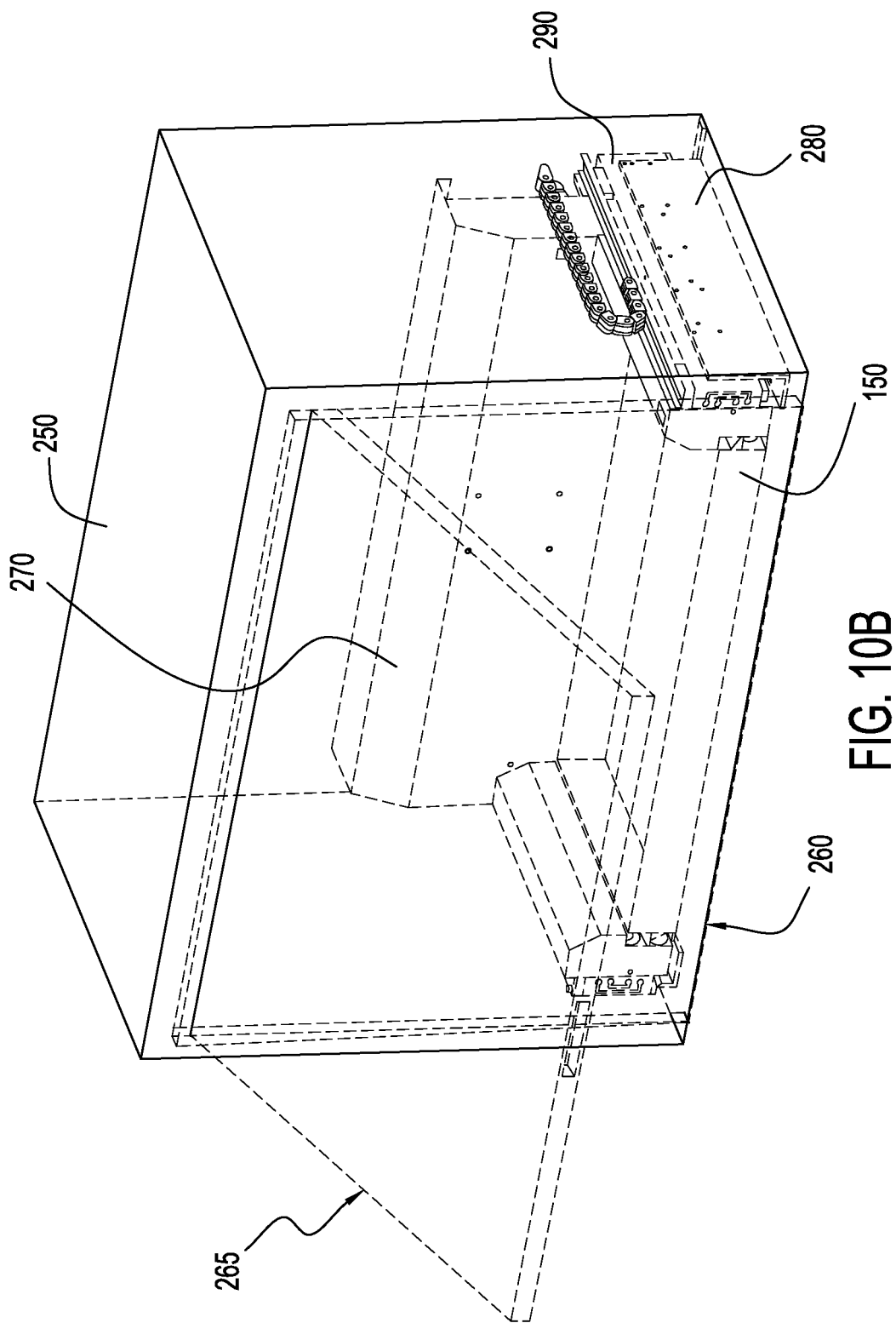
FIG. 10B—depicts certain embodiments of a cargo lowering slide assembly in a horizontally retracted position with the cargo platform within a storage compartment or enclosure, with a door in a closed and intermediate configuration.
Figure 10C:
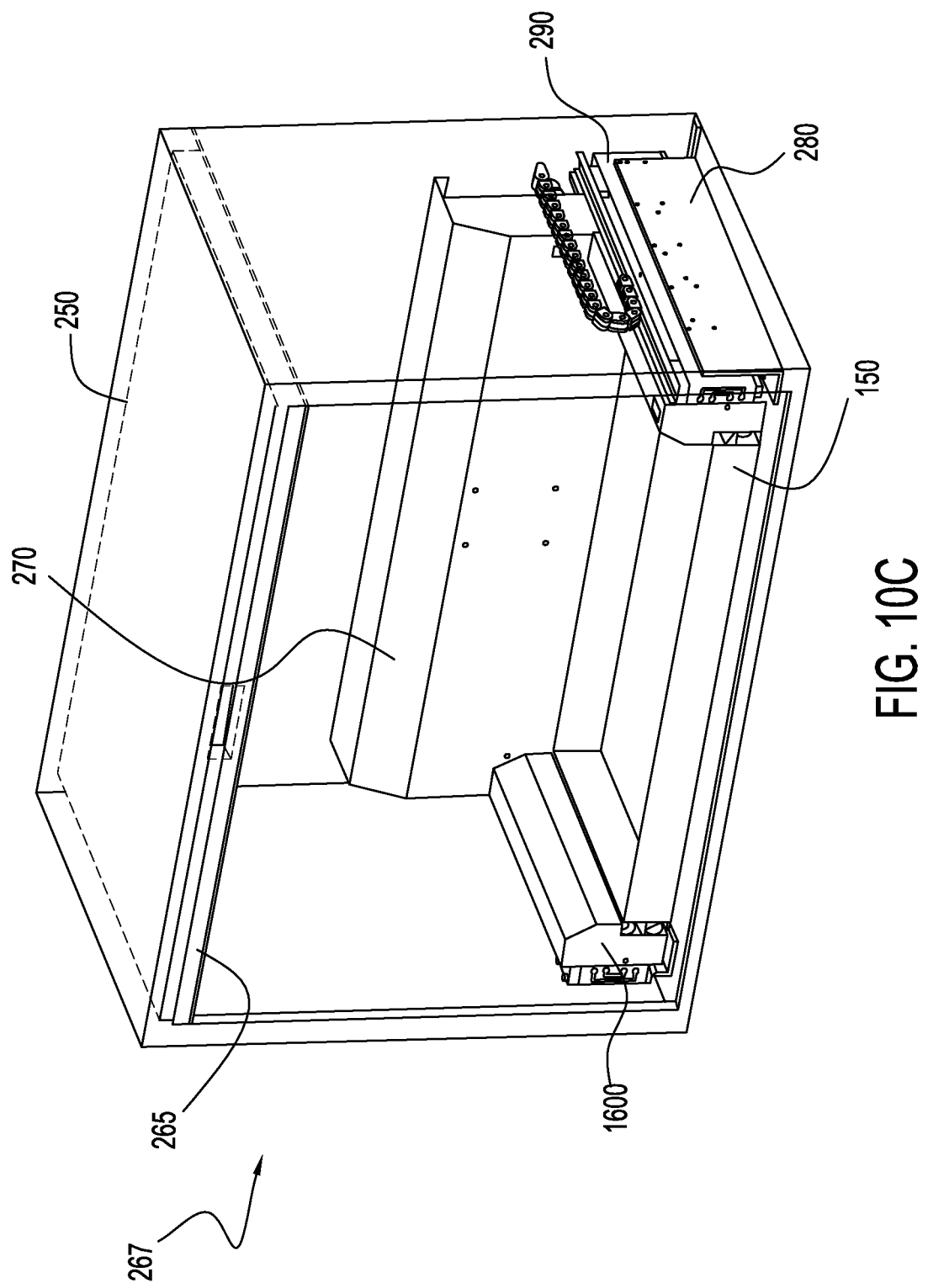
FIG. 10C—depicts certain embodiments of a cargo lowering slide assembly in a horizontally retracted position with the cargo platform within a storage compartment or enclosure, with a door in an open configuration.
Figure 10D:
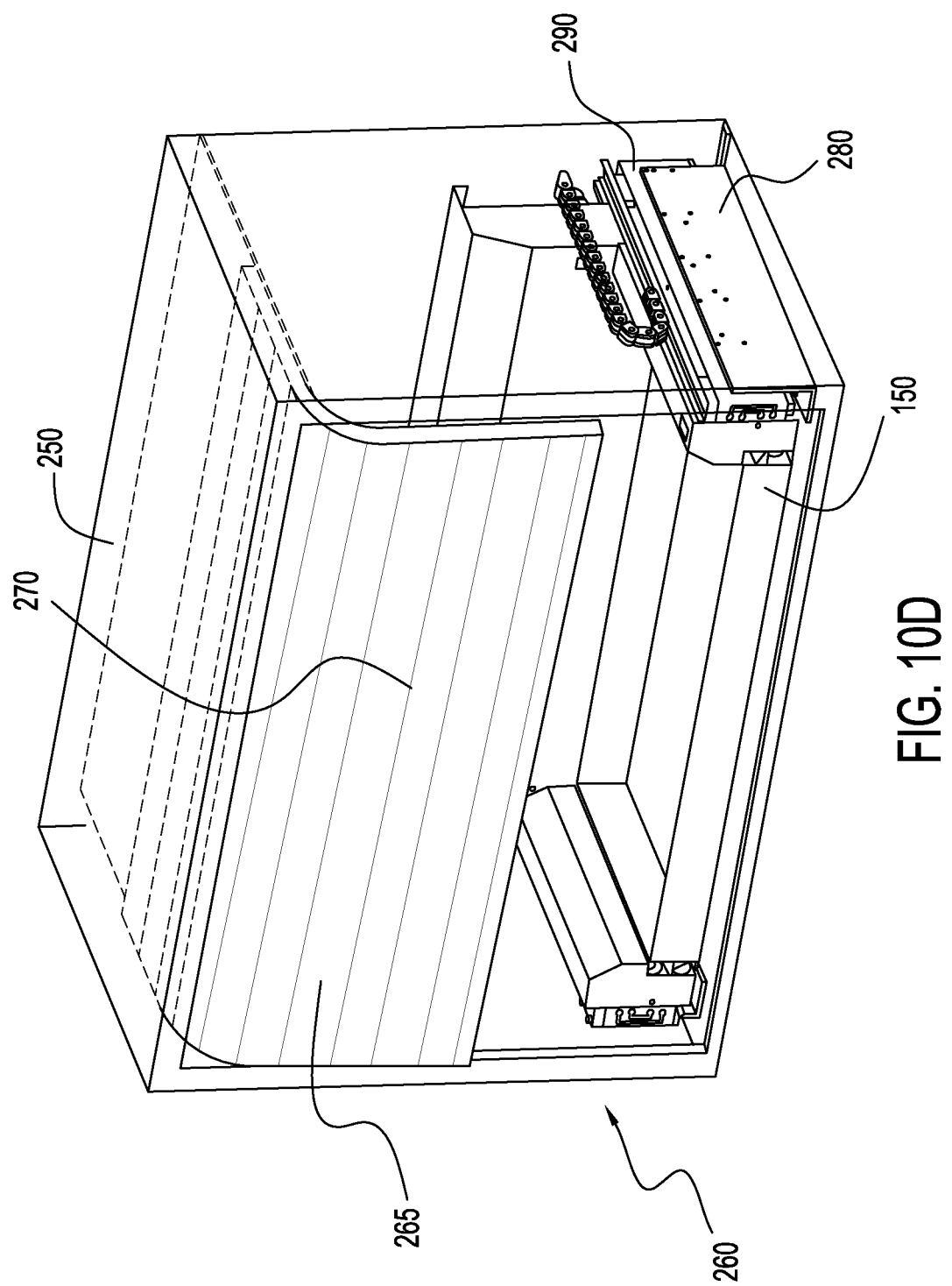
FIG. 10D—depicts certain embodiments of a cargo lowering slide assembly in a horizontally retracted position with the cargo platform within a storage compartment or enclosure, with a door in an intermediate configuration.
Figure 11:
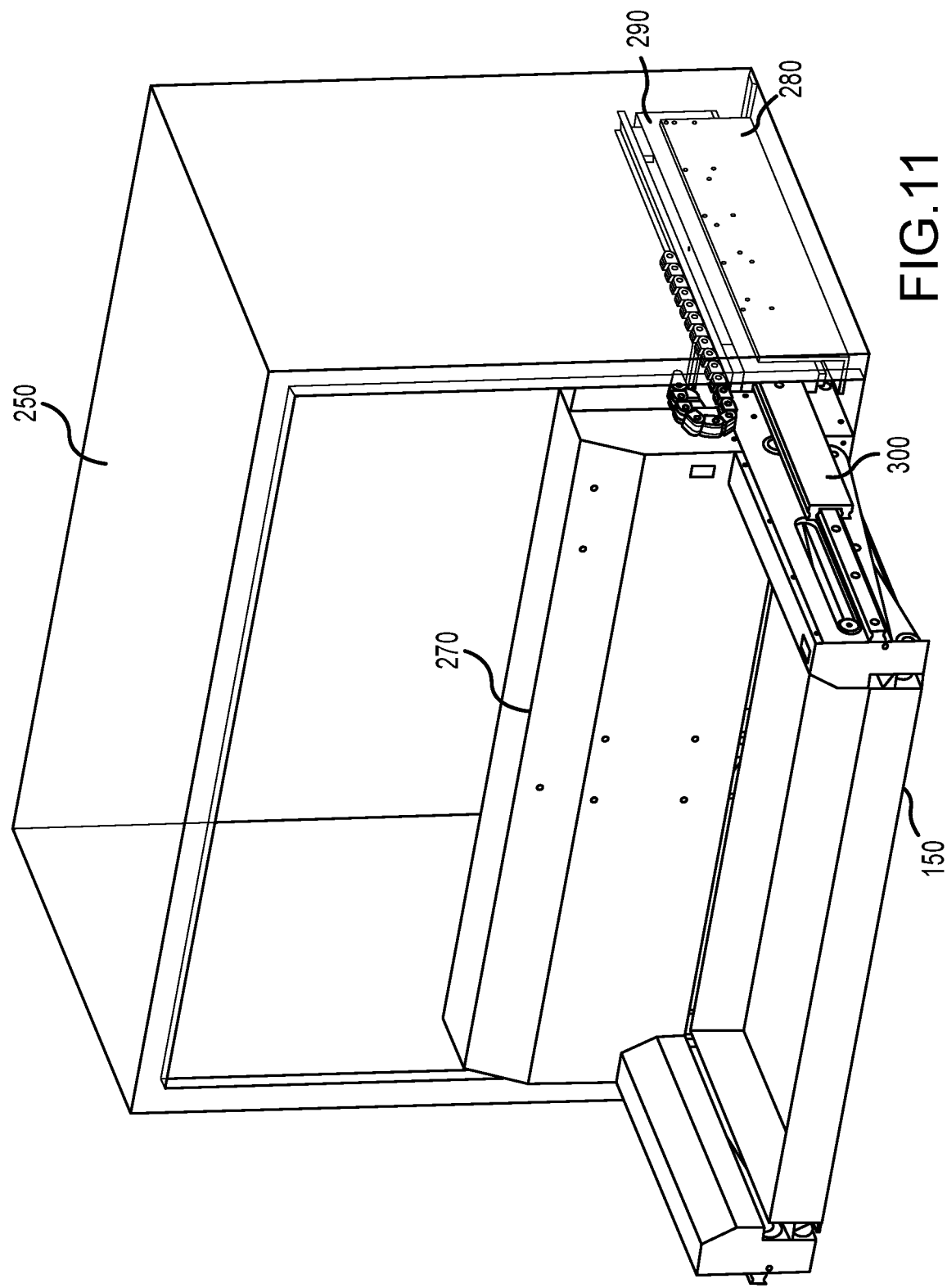
FIG. 11—depicts certain embodiments of a cargo lowering slide assembly with the cargo platform in a horizontally extended position outside of a storage compartment or enclosure.
Figure 12:
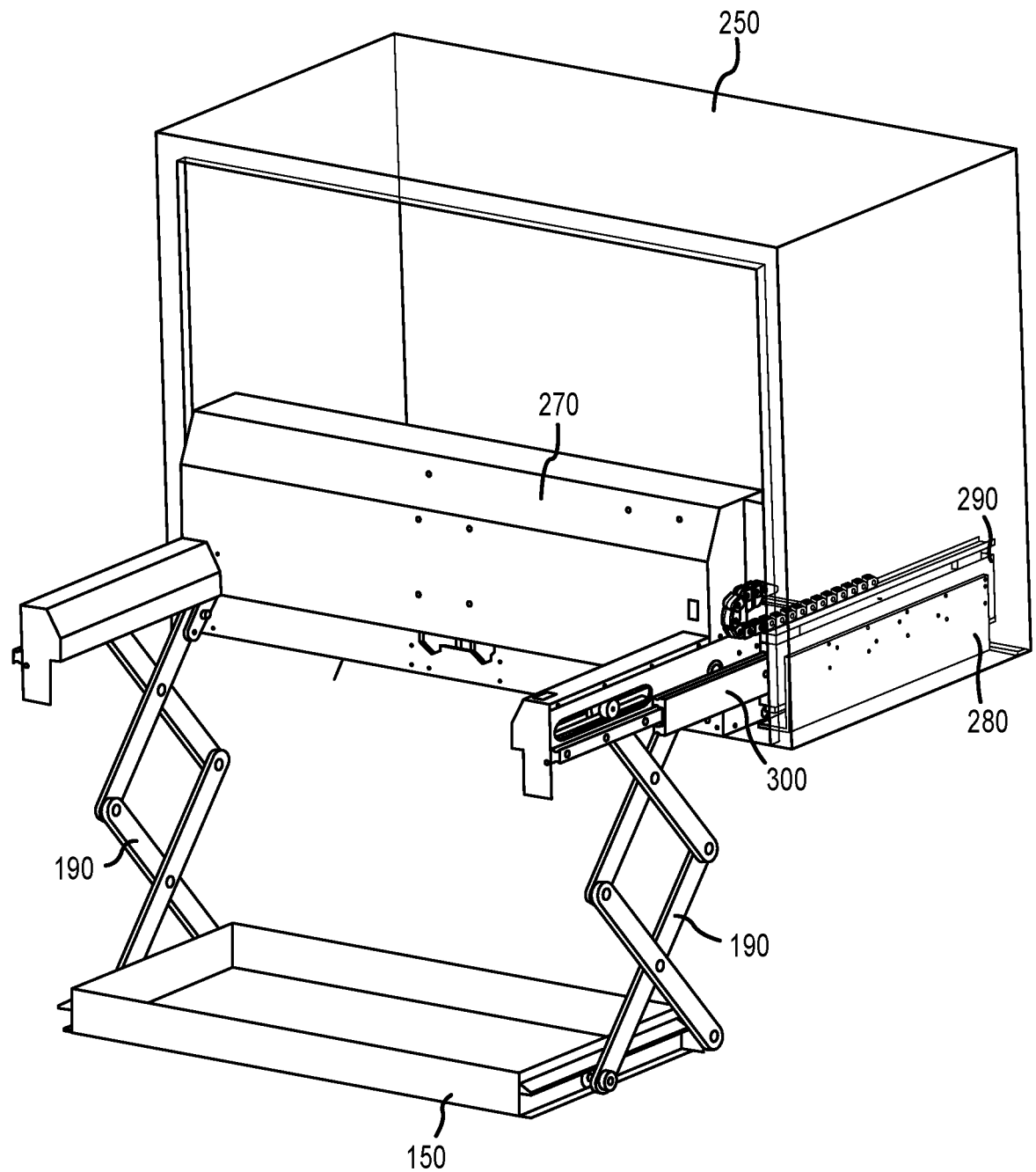
FIG. 12—depicts certain embodiments of a cargo lowering slide assembly with a cargo platform in a horizontally extended and vertically lowered position outside of a storage compartment or enclosure.
Figure 13:
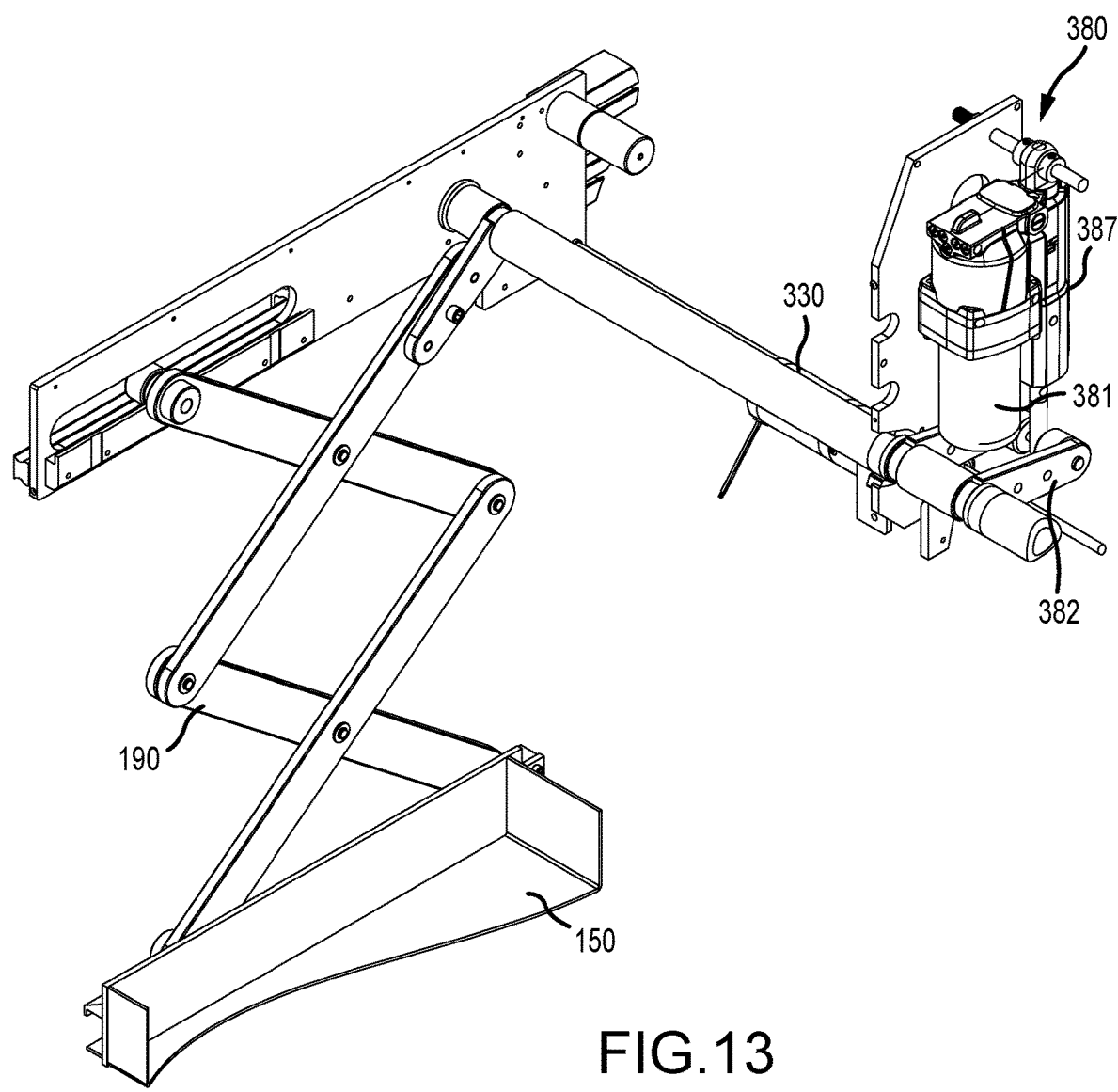
FIG. 13—depicts the scissor arm configuration in certain embodiments showing a first side portion of the actuator devices.
Figure 18B:
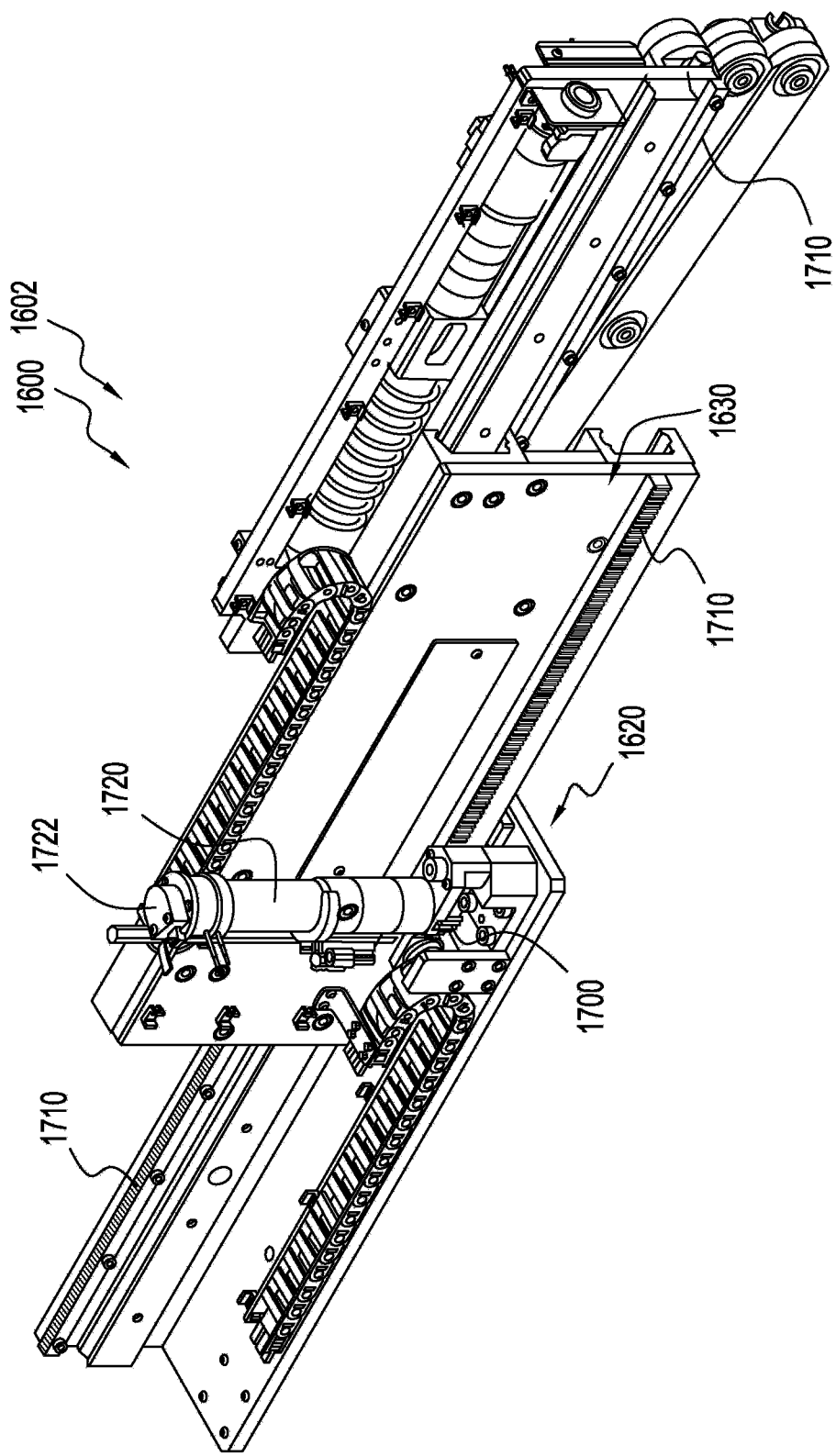
FIG. 18B—an isometric view of certain embodiments comprising a first slide assembly in an extended configuration and raised configuration.
Figure 18C:
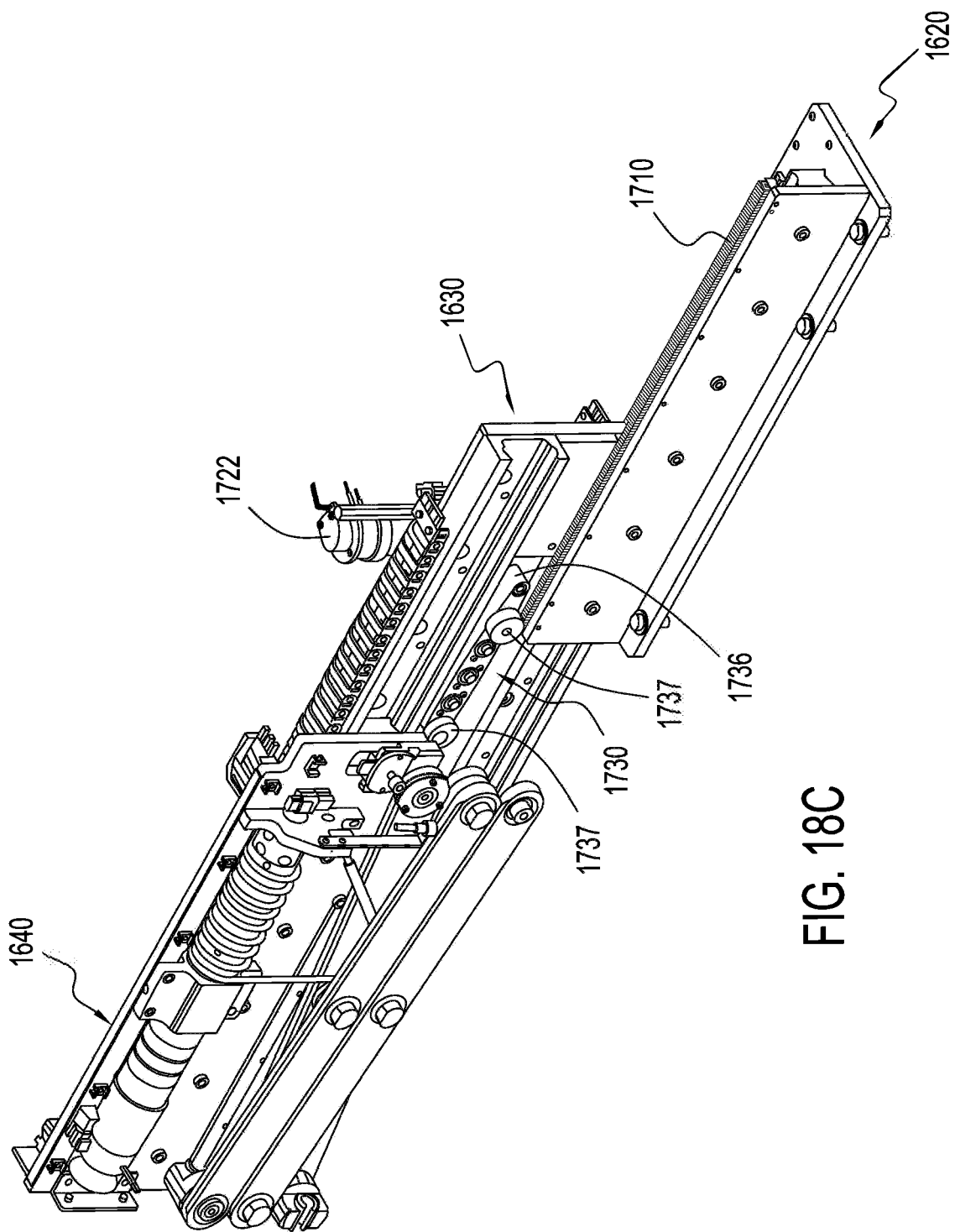
FIG. 18C—an isometric view of certain embodiments comprising a first slide assembly in an extended configuration and raised configuration.
Figure 18D:
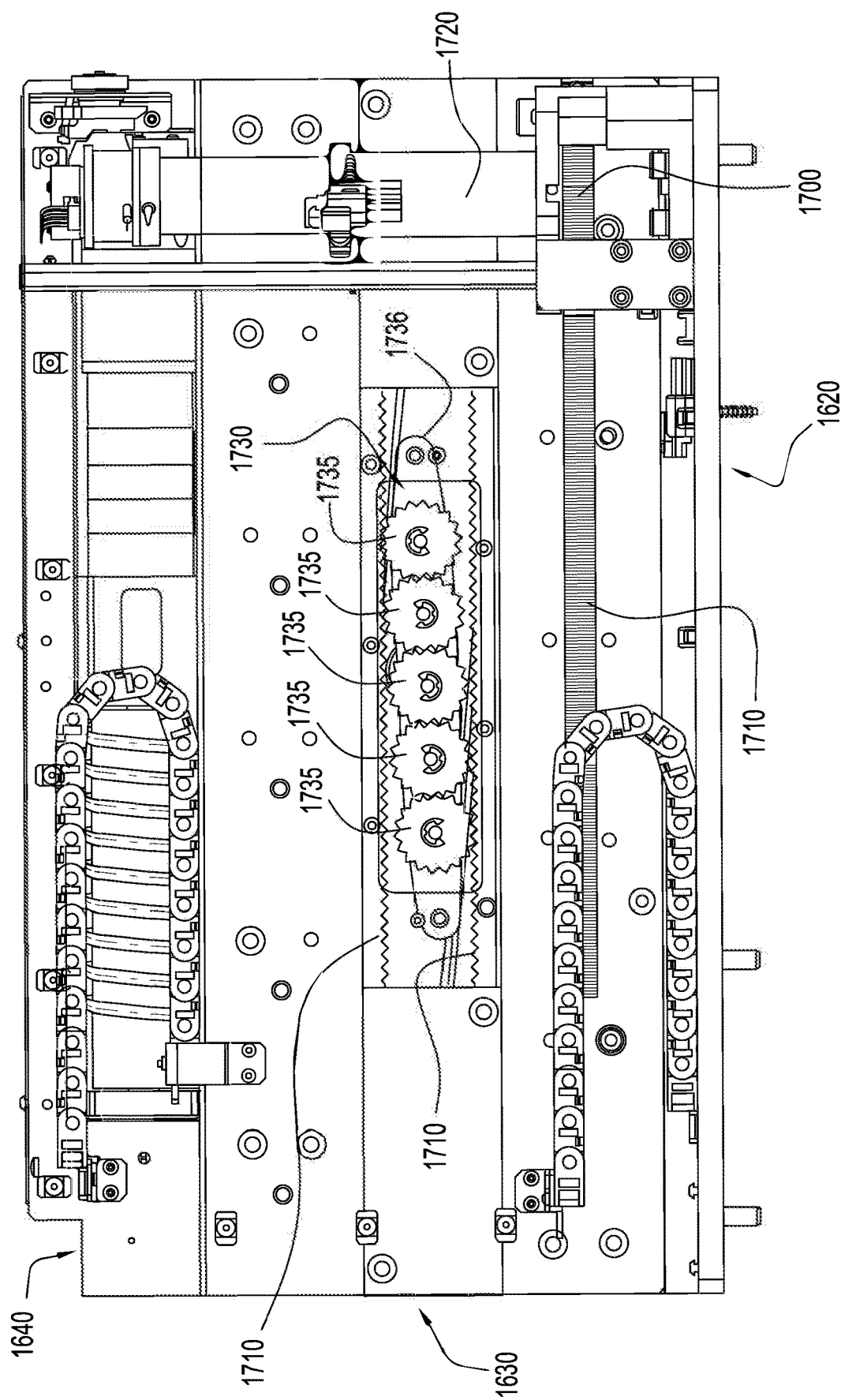
Figure 18E:
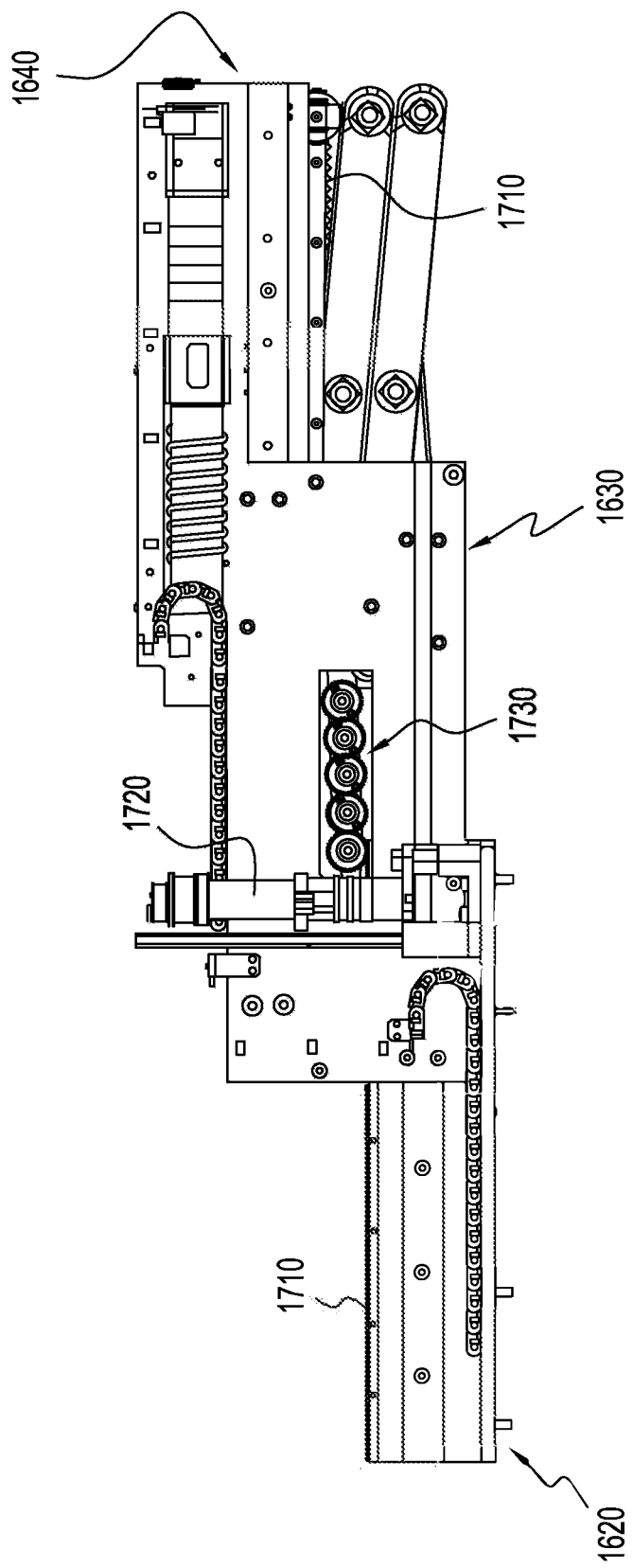
Figure 18F:
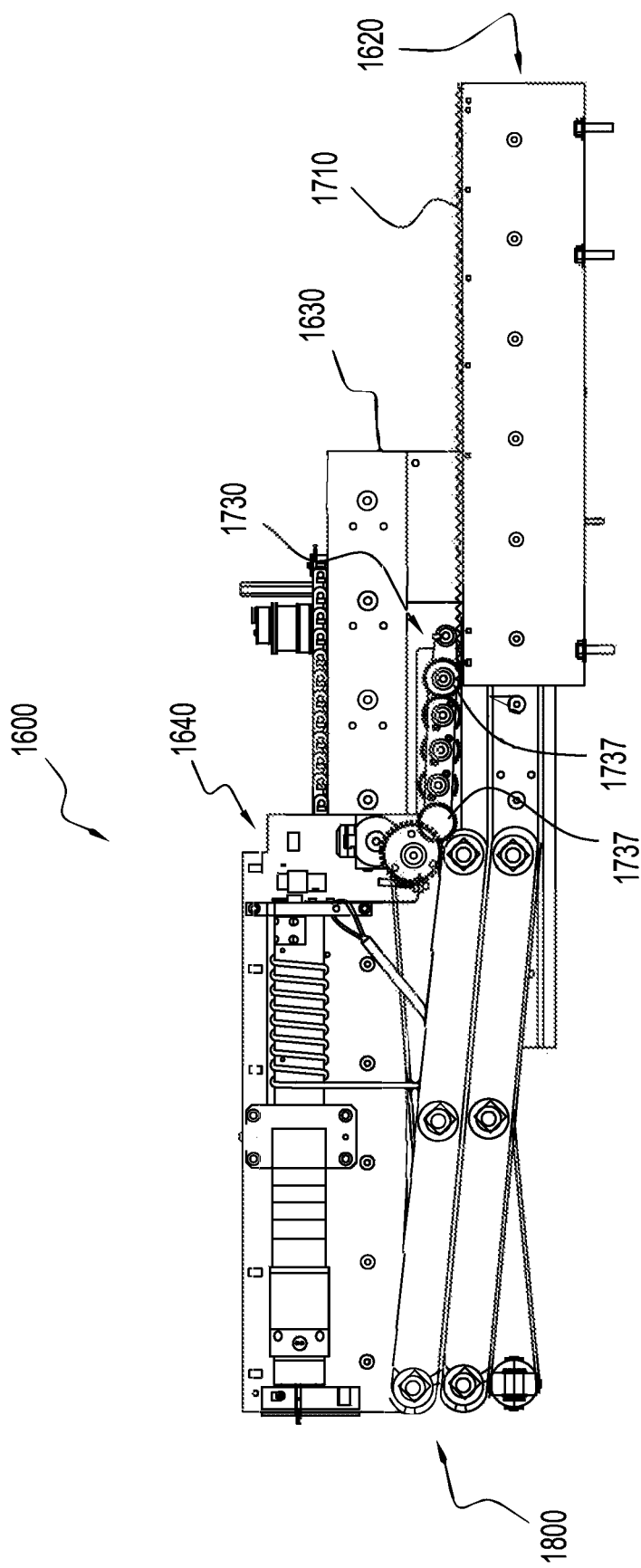

In certain embodiments, the adjustment of one or more elements are facilitated or enabled by electromechanical or other motion-augmented means known to those skilled in the art. Control of the electric, electric hydraulic or air actuator devices in the present invention may be achieved via numerous methods including mechanical actuated electrical switches mounted directly to the cargo lowering slide assembly or via wireless switching mechanisms including smart phone actuation or integration into vehicle multiplexing networks. These control systems may include mechanical, electro-mechanical, or module to control the sequence of extension, lowering, raising, and retraction of the cargo lowering slide assembly. For example, the control system may include sensors—including, but not limited to: encoders, proximity switches, and modules—that prohibit the cargo lowering slide assembly from: (1) extending horizontally unless the door 265 of the enclosure is in a fully opened position (FIG. 10C); (2) lowering the cargo platform unless the slide assemblies are in a fully extended position (FIG. 18B); or (3) retracting horizontally unless the scissor arms are in a fully retracted or raised position (FIG. 18B). The cargo lowering slide assembly may also include sensors or a module to warn if the weight of the load in the cargo platform exceeds design parameters. The cargo lowering slide assembly may also include motor overload protection for sensing such events as jamming of the horizontal or vertical movement of the assembly. The cargo lowering slide assembly may also include audio and/or visual indicators to indicate or warn the user that the slide assembly will be moving or is moving. In certain embodiments, the electromechanical or other motion-augmented means are interconnected and/or in communication with a controller that controls the positioning or movement of the cargo lowering slide assembly.

Figure 18G:
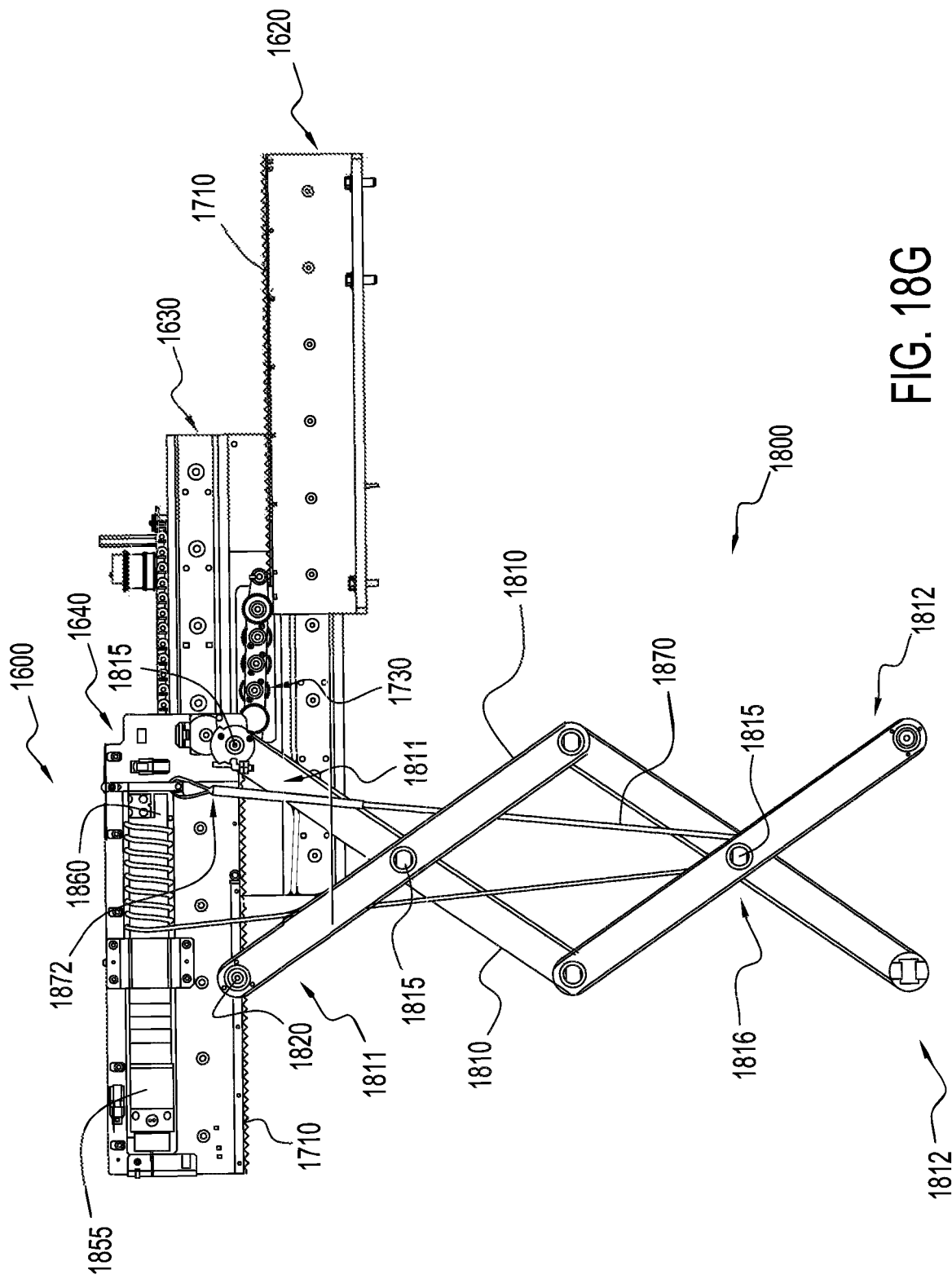

In certain embodiments a cargo lowering slide assembly, shown in FIG. 18G, comprises sensors and encoders which detect the position of a door 265 (FIG. 10B-FIG. 10D), the position of a slide assembly 1600, and the position of a scissor lift assembly 1800. The sensors and encoders communicate status with the controller 1605 (FIG. 16A) which restricts the actuation of certain elements without particular prerequisite conditions being met. For instance, as shown in FIG. 10B-FIG. 10C, a slide assembly 1600 is not permitted to extend (shown in FIG. 11) unless the door 265 is in a fully open configuration 267. It will be appreciated that encoders, proximity switches, or modules which communicate with the controller 1605 to determine the configuration or position of various elements of the invention as described herein may be used interchangeably while in keeping with the spirit and scope of the present invention.

Figure 16A:
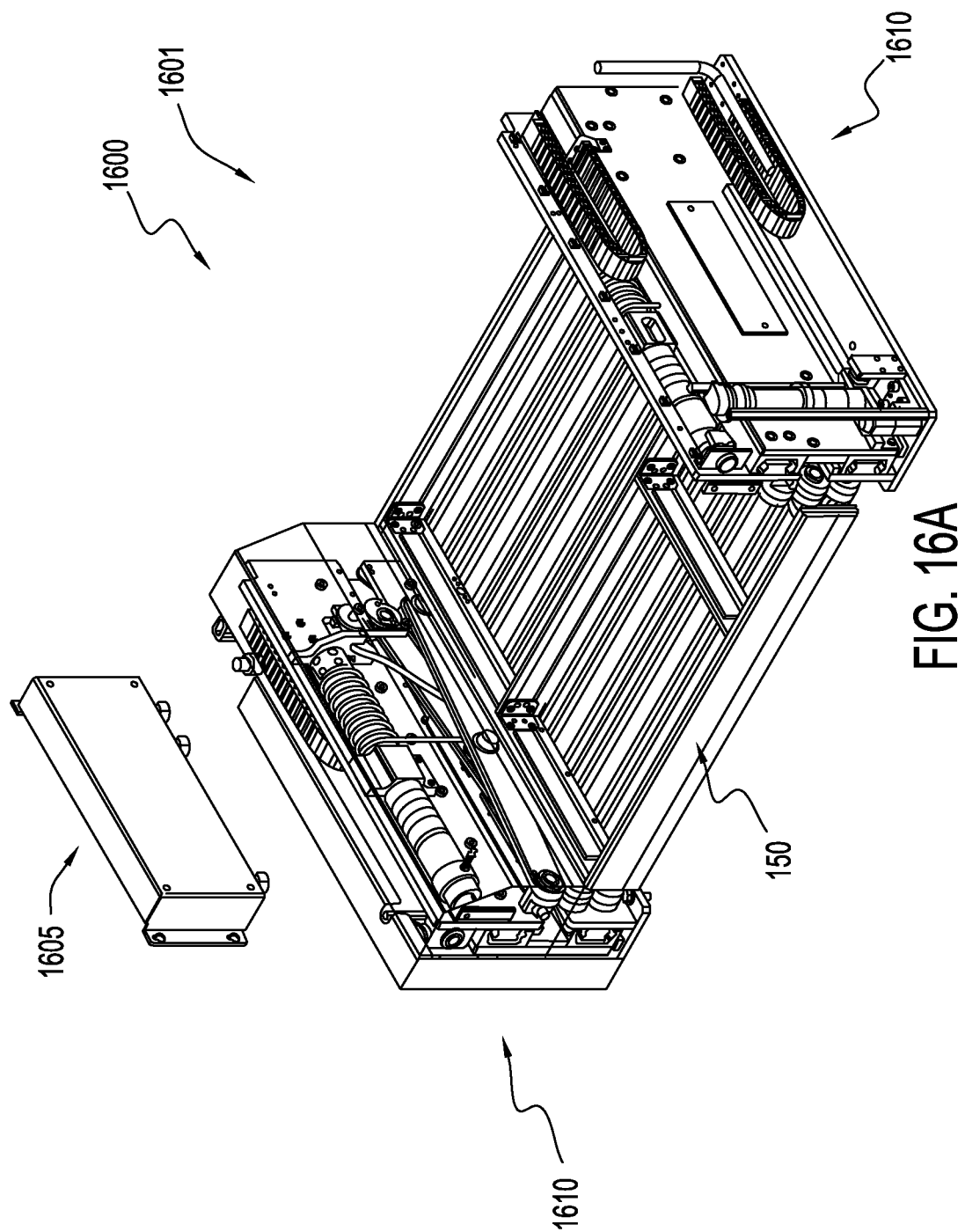
FIG. 16A—an isometric view of certain embodiments of a cargo lowering slide assembly in a fully stowed configuration.
Figure 16B:
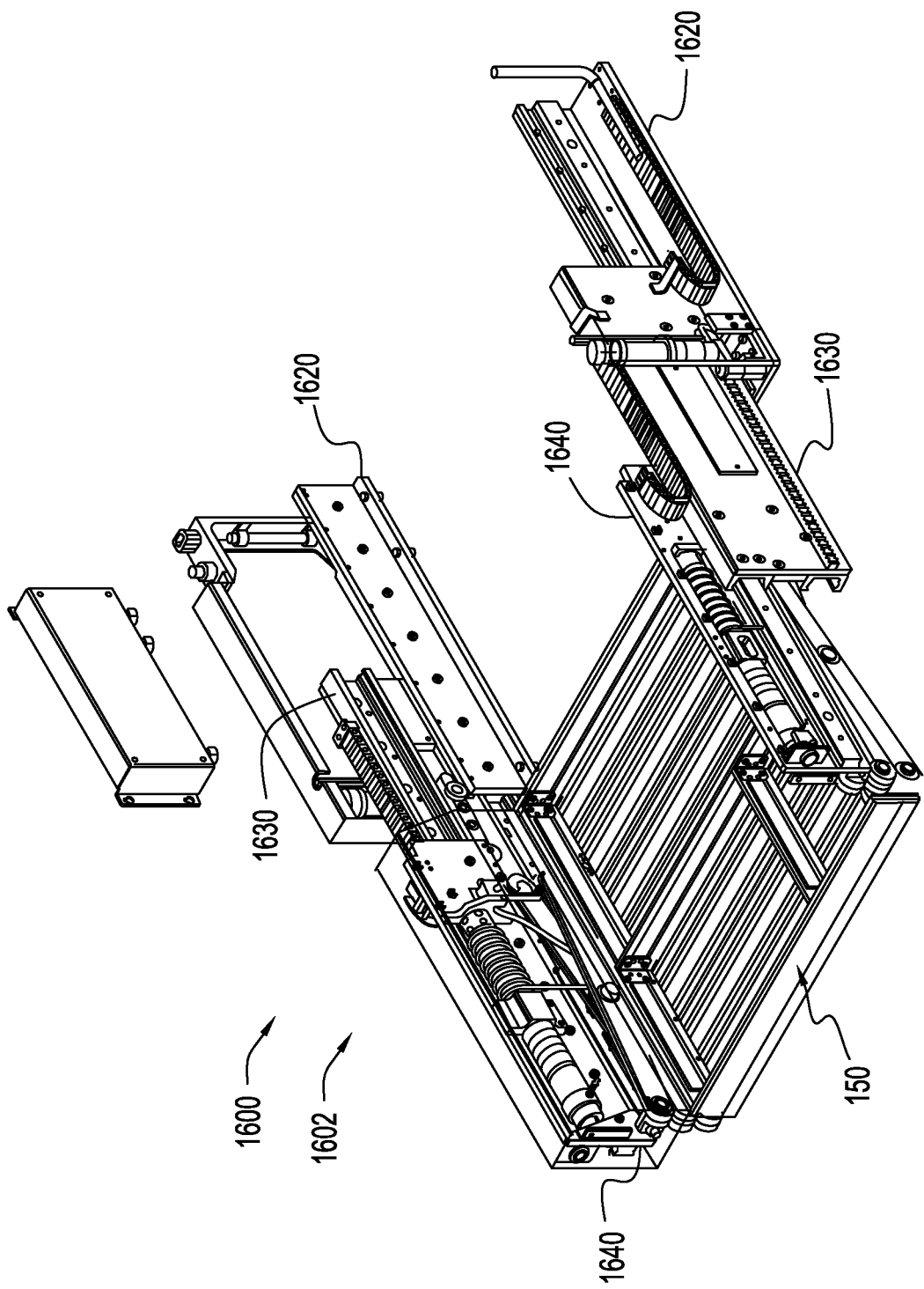
FIG. 16B—an isometric view of certain embodiments of a cargo lowering slide assembly in an extended configuration.
Figure 16C:
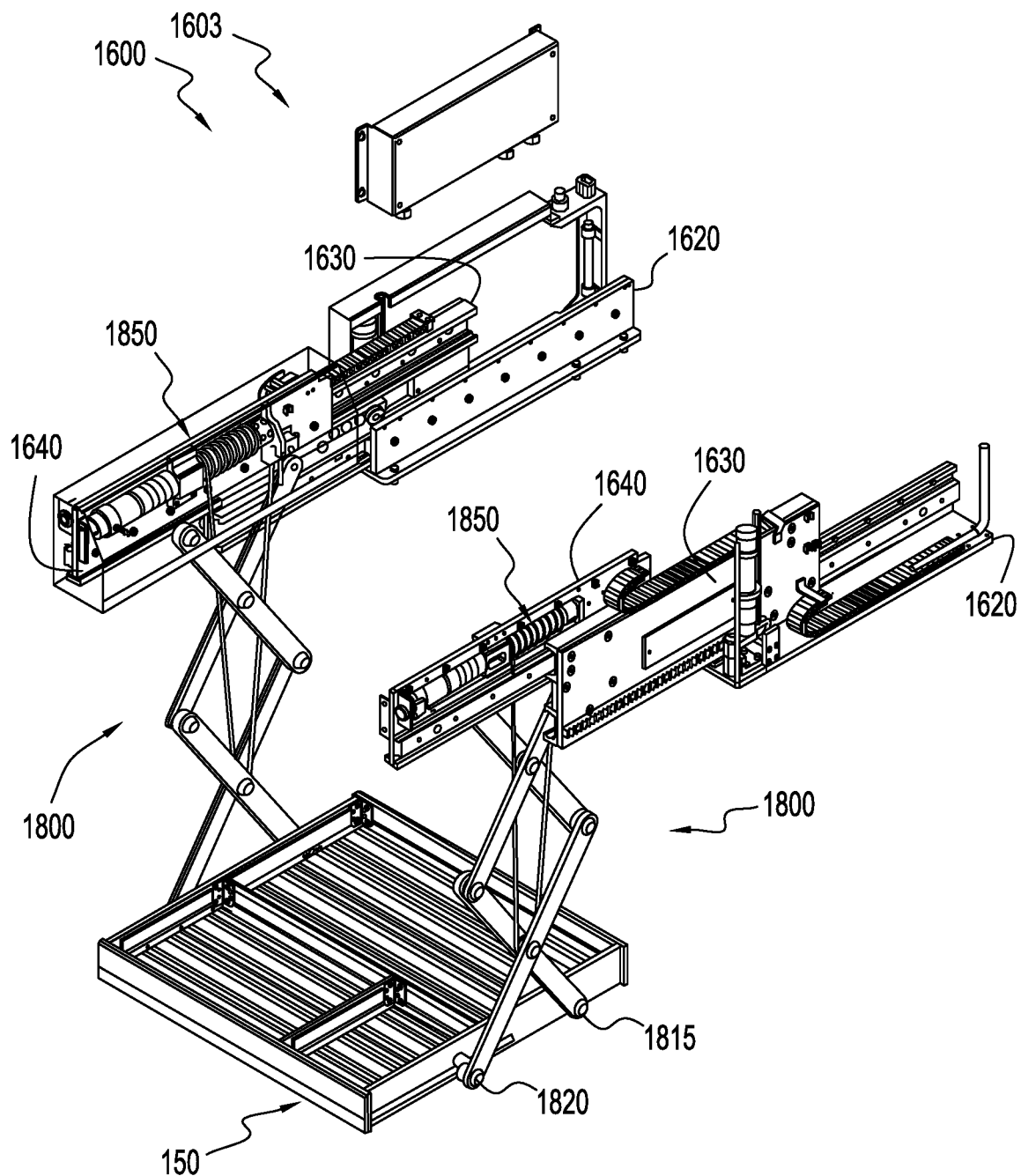
FIG. 16C—an isometric view of certain embodiments of a cargo lowering slide assembly in a fully deployed configuration.

In certain embodiments, seen in FIG. 16A-FIG. 16C, a cargo lowering slide assembly 1600 comprises a first slide assembly 1610 and a second slide assembly 1610. Each slide assembly 1610 comprises a first slide rail 1620, a second slide rail 1630, and a third slide rail 1640—the slide rails being slidably interconnected to each other. In certain embodiments, as demonstrated in FIG. 17, the first slide rail 1620 and the third slide 1640 rail are co-planar, and the second slide rail 1630 is offset from the first slide rail 1620 and the third slide rail 1640. In certain embodiments (FIG. 16A-FIG. 17), a foot 1625 of the first slide rail is affixed to a structure 251. In certain embodiments, the slide assembly 1610 is configured such that when the second slide rail 1630 slidably extends or retracts longitudinally in relation to the first slide rail 1620, the third slide rail 1640 respectively extends or retracts longitudinally from the second slide rail 1630 and first slide rail 1620.

In certain embodiments, a first slide rail 1620, second slide rail 1630, and third slide rail 1640 are slidably interconnected wherein the relative longitudinal movement of any slide rail translates to the respective longitudinal movement of the second slide rail 1630 and third slide rail 1640 toward or away from the first slide rail 1620 in concert.

In certain embodiments, seen in FIG. 18A-FIG. 18D, the first slide rail 1620 comprises a spur gear 1700 intermeshed with a rack gear 1710 interconnected with the second slide rail 1630, wherein the rotation of the spur gear 1700 of the first slide rail results in the longitudinal displacement of the second slide 1630 rail in relation to the first slide rail 1620. In certain embodiments the spur gear 1700 of the first slide rail is driven by a horizontal drive motor 1720. In certain embodiments the horizontal drive motor 1720 further comprises an encoder 1722 which measures rotation, and senses when the slide assembly 1600 is in a fully stowed configuration 1601, fully extended configuration 1602, and configurations therebetween.

Figure 17:
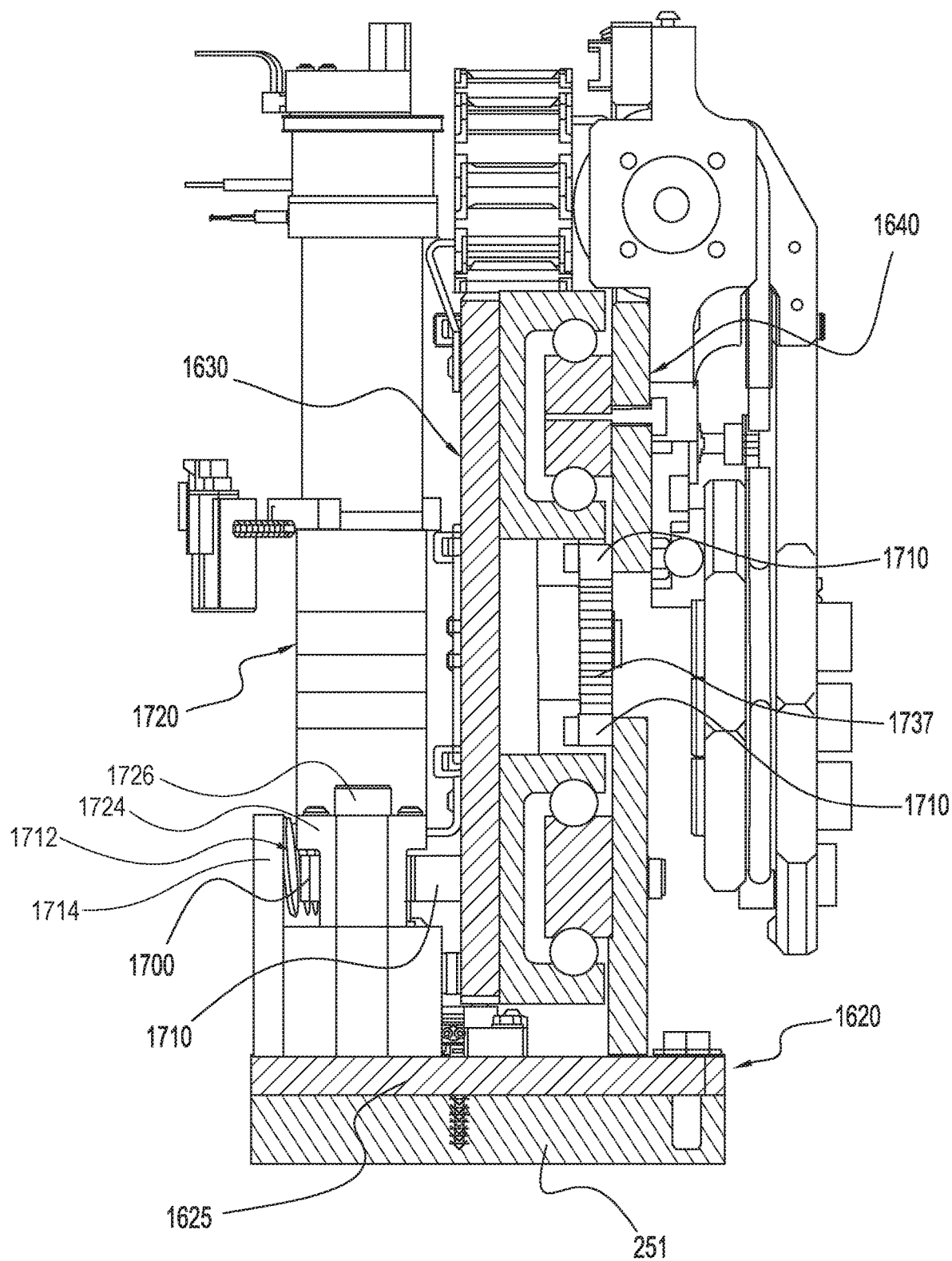
FIG. 17—a cross-sectional front view of certain embodiments comprising a first slide assembly.

In certain embodiments, shown in FIG. 17-FIG. 18G the first slide rail 1620 comprises a rack gear 1710, the third slide rail 1640 comprises a rack gear 1710, and the second slide rail 1630 comprises a spur gear assembly 1730 which intermeshes with the rack gears 1710 of the first slide rail 1620 and third slide rail 1640. It will be appreciated that although multiple embodiments discussed herein disclose a spur gear, a spur gear may be replaced with a pinion gear of varying tooth configurations including, but not limited to, a helical gear, a double helical gear, or any type of gear configured to mesh with the rack gear 1710. The spur gear assembly 1730 is configured to simultaneously intermesh with the rack gear 1710 of the first slide rail and the rack gear 1710 of the third slide rail thereby resulting in the first slide rail 1620, the second slide rail 1630, and the third slide rail 1640 move in concert. The spur gear assembly 1730 of certain embodiments is intermeshed with the rack gear 1710 of the second slide rail and the rack gear 1710 of the third slide rail simultaneously, wherein the longitudinal movement of the second slide 1630 rail relative to the first slide rail 1620 results in rotation of the spur gear assembly 1730, thus imparting rotational input from the spur gear assembly 1730 to the rack gear 1710 of the third slide rail, thereby translating to longitudinal movement of the third slide rail 1640 relative to the second slide rail 1630 in substantially the same direction as the longitudinal movement of second slide rail 1630.

In certain embodiments, seen in FIG. 18D-FIG. 18G, a spur gear assembly 1730 comprises five spur gears 1735 intermeshed in a substantially linear configuration, each spur gear 1735 is axially interconnected to a spur gear assembly structure 1736 wherein the spur gear assembly structure is interconnected to the second slide rail 1630. The first distal spur gear 1735 and second distal spur gear 1735 of the spur gear assembly are axially interconnected to a first spur drive gear 1737 and a second spur drive gear 1737 respectively, wherein the spur drive gears 1737 are offset from the distal spur gears 1735. The rotation of the first spur drive gear 1737 results in the direct rotation of the first distal spur gear 1735. The rotation of the first distal spur gear 1735 results in the actuation of the spur gear assembly 1730, which results in the rotation of the second distal spur gear 1735, thus translating to the rotation of the second spur drive gear. A bottom aspect of the first spur drive gear 1737 engages with the rack gear 1710 of the first sliding rail, and the top of the second spur drive gear 1737 engages with the rack gear 1710 of the third sliding rail. Thus, the longitudinal movement of the second slide rail 1630 or the third slide rail 1640 in relation to the first slide rail 1620, results in the second slide rail 1630 and third slide rail 1640 sliding in the same longitudinal direction in relation to the first slide rail 1620. It will be appreciated that certain configurations of the spur gear assembly 1730, an odd number of spur gears 1735 will result in similar translation of individual slide rail movements to the movement of all slide rails in concert, and are in keeping with the spirit and the scope of the present invention.

In certain embodiments, shown in FIG. 16A-FIG. 16C and FIG. 18F-FIG. 18G, a slide assembly 1600 comprises a scissor lift assembly 1800 wherein the scissor lift assembly 1800 interconnects the slide assembly 1600 with a cargo platform 150 and allows the vertical raising and lowering of the cargo platform 150 in relation to the slide assembly 1600. The scissor lift assembly 1800 of certain embodiments comprises a scissors mechanism further comprising a scissor linkage having a first scissor arm 1810 and a second scissor arm 1810 which are pivotally interconnected at a pivoting connection 1815. The separation of the first ends 1811 of the scissor linkage from each other results in the separation of the second ends 1812 of the scissor linkage from each other, and resultantly the first ends 1811 of the scissor linkage are drawn toward the second ends 1812 of the scissor linkage—resulting in a lifting action from the scissors mechanism and the scissor lift assembly. Conversely, drawing the first ends 1811 of the scissor linkage toward each other results in the drawing together of the second ends 1812 of the scissor linkage, and resultantly the first ends 1811 of the scissor linkage are separated from the second ends 1812 of the scissor linkage—resulting in a lowering action from the scissors mechanism and the scissor lift assembly. In certain embodiments first ends 1811 of the scissor arms comprise one pivoting connection 1815 and one sliding connection 1820 with the third slide rail 1640, and the second ends 1812 of the scissor arms comprise one pivoting connection 1815 and one sliding connection 1820 (FIGS. 16C and 18G) with the cargo platform 150. It will be appreciated that within certain embodiments of a scissor lift assembly having a scissors mechanism are shown and discussed herein, a scissors mechanism comprising one or more interconnected scissor linkages is in keeping with the spirit and scope of the present invention. It will be further appreciated that although embodiments are shown comprising a scissor lift assembly interconnected with a third slide rail, alternative embodiments comprising a scissor lift assembly interconnected with a slide rail other than the third slide rail as shown, is within the spirit and scope of the present invention.

Figure 18H:
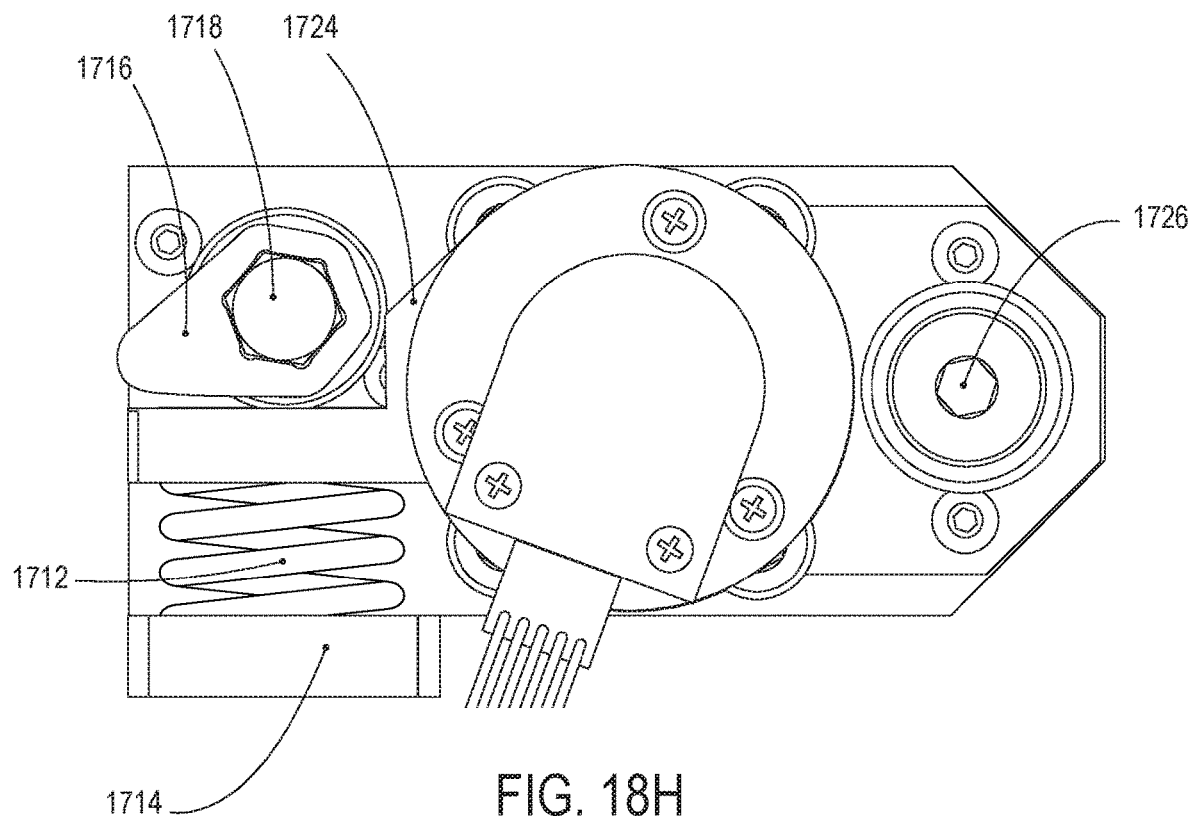
FIG. 18H—depicts certain embodiments of the slide assembly.
Figure 18I:
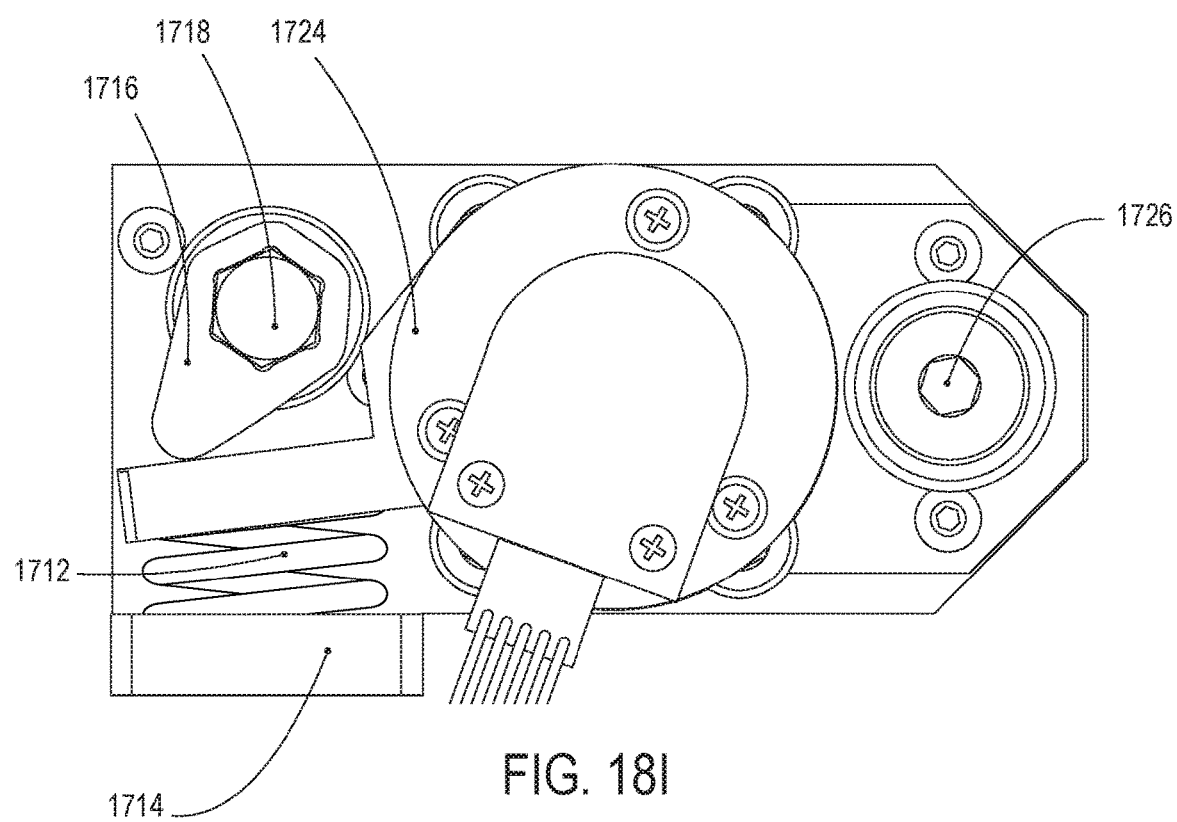
FIG. 18I—depicts certain embodiments of the slide assembly.

In certain embodiments, shown in FIGS. 17, 18A, 18H and 18I, the slide assembly is adapted to allow manual movement of the slide assembly. For example, in the event of a power loss, the horizontal drive motor 1720 can inhibit rotation of spur gear 1700 along rack gear 1710 and prevent manual movement of the slide assembly. This would prevent the manual return of the cargo assembly into the enclosure. To overcome this issue, in certain embodiments as shown in FIGS. 17, 18A, and 18H, the spur gear 1700 is adapted to disengage from rack gear 1710. Horizontal drive motor 1720 is mounted to horizontal motor mount 1724 which is, in turn, rotatably interconnected to the first slide rail 1620 by bearing mount 1726. Bias spring 1712 is configured between bias spring mount 1714 and horizontal motor mount 1724 to bias spur gear 1700 towards and engage with rack gear 1710. To disengage spur gear 1700 from rack gear 1710, the user may rotate release cam shaft 1718 using a 12 mm socket wrench which rotates release cam 1716 against horizontal motor mount 1724 and, in turn, causes horizontal motor mount 1724 to rotate about bearing mount 1726 and move spur gear 1700 away and disengage from rack gear 1710 as shown in FIG. 18I.

Figure 19:
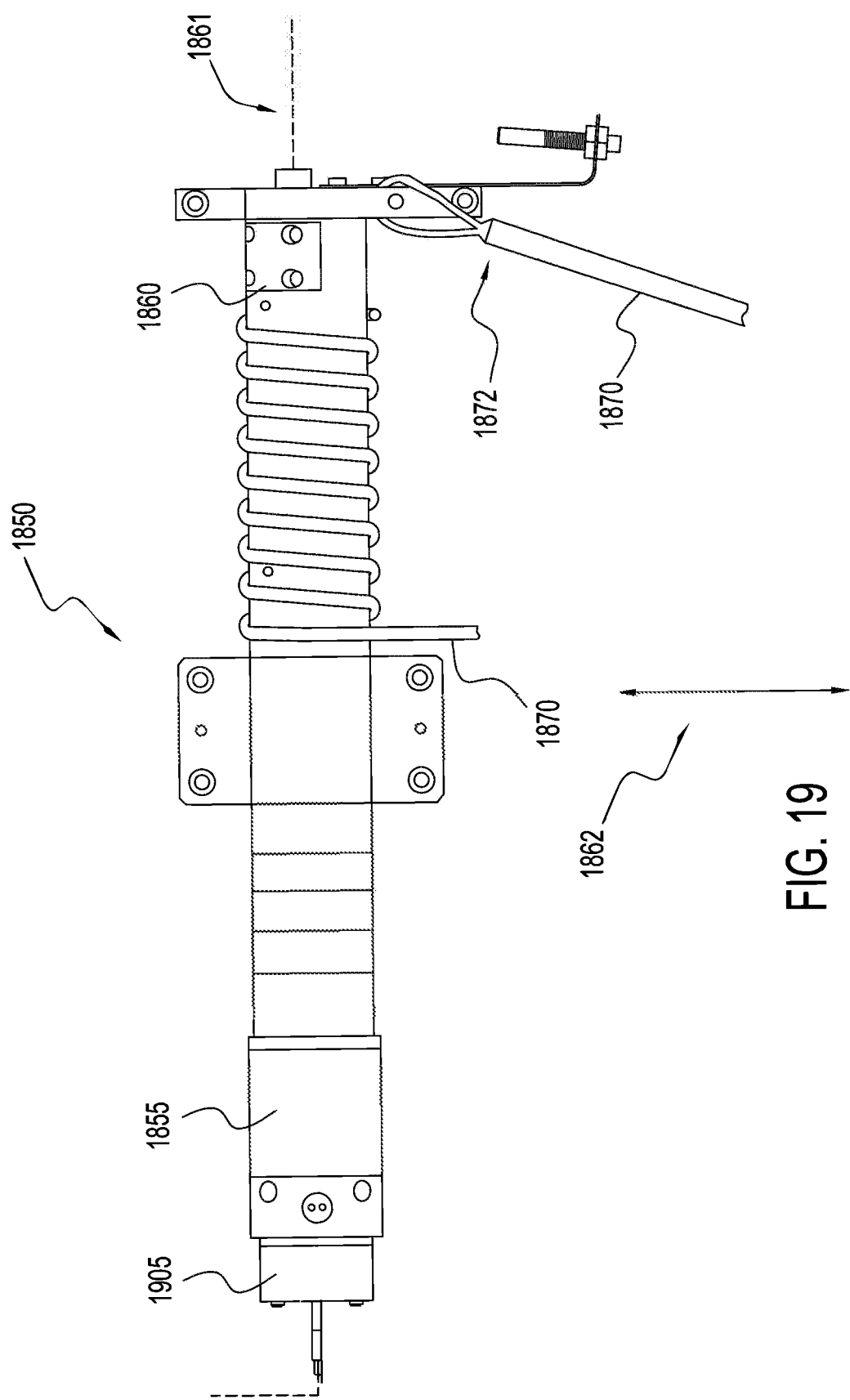
FIG. 19—a side view of a cable lift assembly of certain embodiments

Certain embodiments, shown in FIG. 18G-FIG. 19, comprise a cable lift assembly 1850 wherein a cable 1870 is interconnected with a scissor lift assembly 1800 wherein a portion or the majority of the weight of a load carried by the scissor lift assembly 1800 is borne by the cable lift assembly 1850. The cable 1870 may be any suitably strong and flexible material such as a steel wire rope, a synthetic or natural fiber rope, or a braided cord.

In certain embodiments, the cable lift assembly 1850 comprises a motor 1855 which is interconnected with a drum 1860 or cylinder. The drum is oriented with a longitudinal axis 1861 substantially perpendicular to the direction of travel 1862 of the scissor lift assembly 1800 for the lifting and lowering of the cargo platform 150. The cable 1870, interconnected to and wrapped around the drum 1860, is extended or retracted through the rotation of the drum 1860 by the motor 1850 in a clockwise or counter-clockwise direction. Thus, the cable 1870 being interconnected with the scissor lift assembly 1800, raises and lowers the scissor lift assembly 1800 and the cargo platform 150. In certain embodiments the cable 1870 is interconnected to a pivoting connection 1815 where the first scissor arm 1810 and second scissor arm 1810 are pivotally interconnected. It will be appreciated that a scissor arm comprising a plurality of interconnected members, as shown in FIG. 16C and FIG. 18G are within the spirit and scope of the present invention.

Figure 16D:
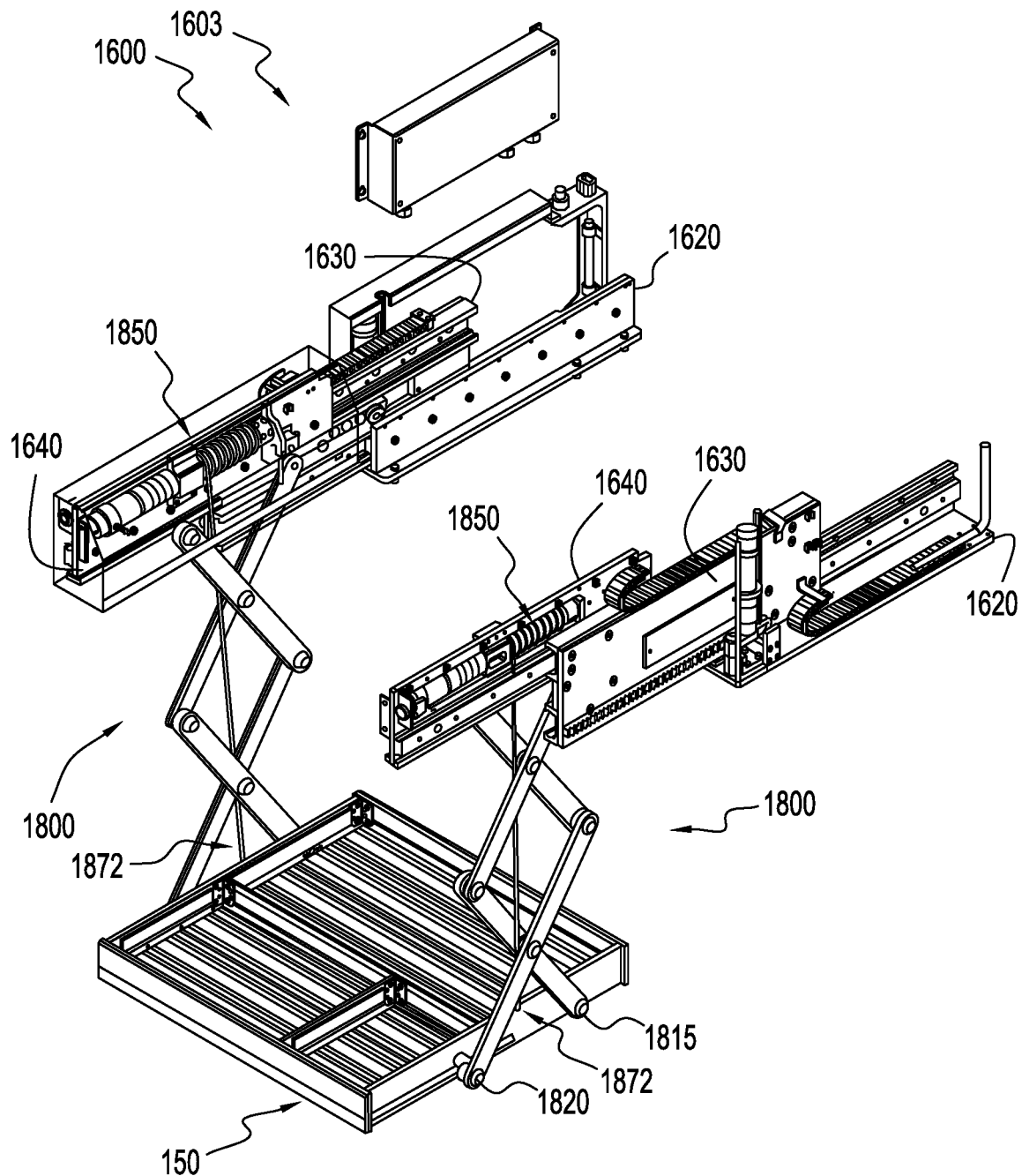
FIG. 16D—an isometric view of certain embodiments of a cargo lowering slide assembly in a fully deployed configuration.

In certain embodiments comprising a cable lift assembly, shown in FIG. 18G-FIG. 19, a first end 1871 of the cable is interconnected to a drum 1860, the drum 1860 is rotatively interconnected with a slide rail 1640, the second end 1872 of the cable 1870 is interconnected to the slide rail 1640, and an intermediate aspect of the cable 1870 located therebetween is configured to interface with a pivoting connection 1815 of the scissor lift assembly. Such embodiments create a mechanical advantage for the lifting of the scissor lift assembly 1800 and the cargo platform 150. In certain embodiments, the pivoting connection 1815 which the cable 1870 is interconnected with, further comprises a bearing 1816 or other rotational friction reducing device such as a brass bushing or polymeric bushing. The intermediate aspect of the cable interfaces with the bearing to further reduce the force required to lift the scissor lift assembly 1800. In certain other embodiments, as shown in FIG. 16D, second end 1872 of the cable 1870 is interconnected to the cargo platform 150. The cable 1870, interconnected to and wrapped around the drum 1860, is extended or retracted through the rotation of the drum 1860 by the motor 1850 in a clockwise or counter-clockwise direction. Thus, the second end 1872 of the cable 1870 being interconnected with the cargo platform 150, raises and lowers the scissor lift assembly 1800 and the cargo platform 150.

In certain embodiments, shown in FIG. 16C, a first scissor lift assembly 1800 carries a first side of the cargo platform 150, and a second scissor lift assembly 1800 carries a second side of the cargo platform 150. A first cable lift assembly 1850 raises and lowers the first scissor lift assembly 1800 and a second cable lift 1850 assembly raises and lowers the second scissor lift assembly 1800.

Figure 20:
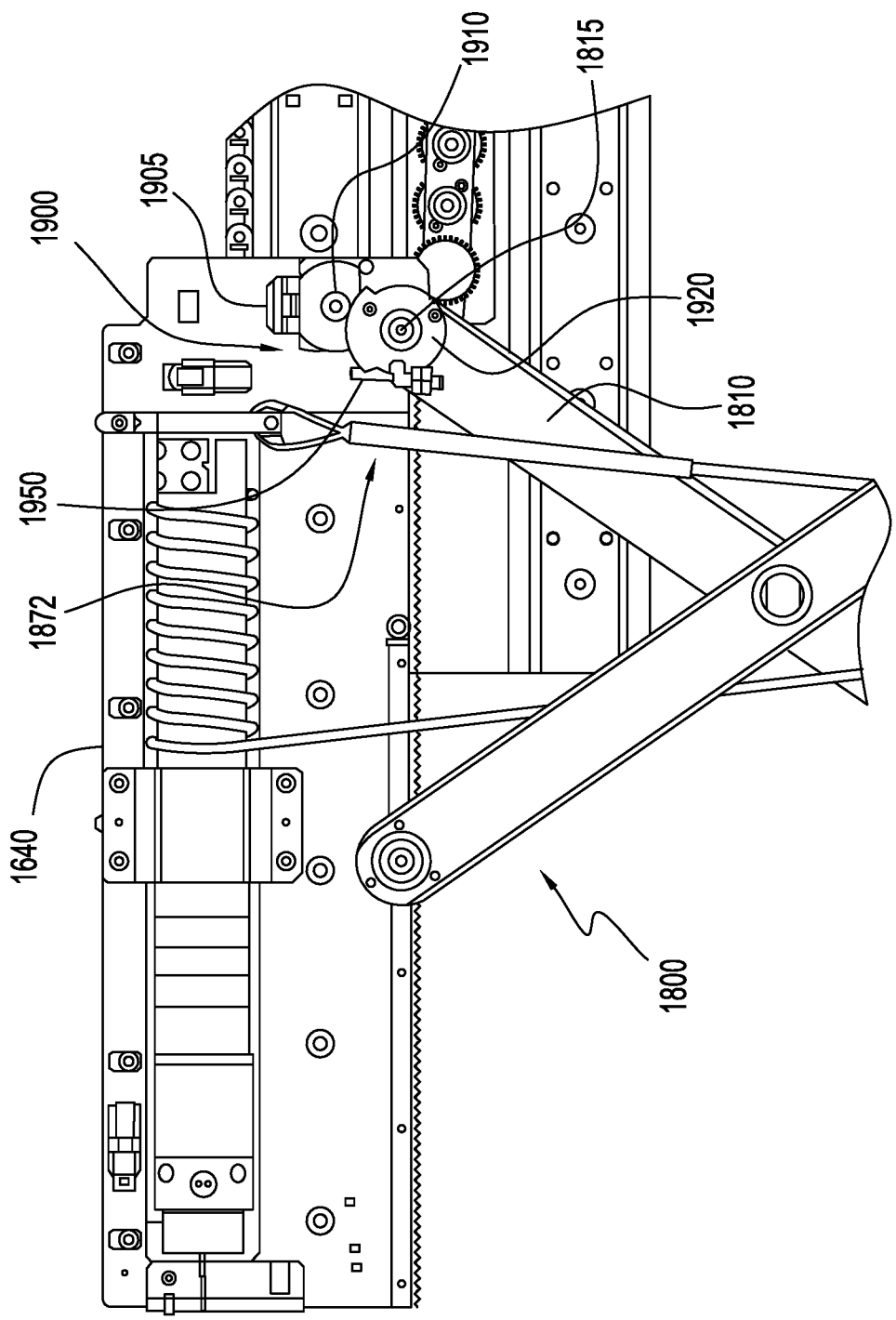
FIG. 20—a side view of a cable lift assembly of certain embodiments

Certain embodiments, as shown in FIG. 20, include a rotary encoder assembly 1900 comprising a rotary encoder 1905, a first gear 1910, and a second gear 1920—is interconnected to a slide rail 1640 and a first scissor arm 1810 in order to determine the position of the first scissor arm 1810—and thus the scissor arm assembly 1800—between a fully raised and fully lowered configuration. In certain embodiments, the rotary encoder 1905 is interconnected with the third slide rail 1640, and the first gear 1910 is interconnected to the rotary encoder 1905 wherein the rotation of the first gear 1910 results in the rotation of the rotary encoder 1905. The second gear 1920 is interconnected to a pivoting connection 1815 of the first arm 1810 of a scissor lifting assembly and intermeshed with the first gear 1910. As the scissor lifting assembly 1800 is raised or lowered, the second gear 1920 rotates in concert with the first arm 1810 of the scissor lifting assembly, thereby rotating the first gear 1910, and the rotary encoder 1905. In certain embodiments a first rotary encoder assembly is interconnected with a first scissor lift assembly, and a second rotary encoder assembly is interconnected with a second scissor lift assembly, wherein the rotary encoders are comparatively monitored in order to maintain the cargo platform in a level condition while raising or lowering the scissor lift assemblies.

It will be appreciated that many embodiments presented and shown herein comprise motors to drive spur gears. It will be appreciated that alternative embodiments not employing motors for the driving of spur gears, or using motors to drive alternative spur gears are within the spirit and scope of the present invention. Furthermore, it will be appreciated that motors employed in certain embodiments may comprise encoders which allow the consistent monitoring of position of a slide rails in relation to each other, or the position of a cargo platform in relation to a slide rail while in keeping with the spirit and scope of the present invention.

In certain embodiments, a drive motor employs motor current monitoring method wherein the sudden and/or unexpected change in current conveys an undesirable scenario such as payload overload, equipment falling off the lift, equipment placed on lift mid-operation, impingement of an object within moving aspects of the cargo lowering slide assembly, an obstacle under the cargo lowering slide assembly which prevents the full deployment of the cargo lowering slide assembly away from or to the ground, or impingement within the cargo lowering slide assembly which prevents the full extension or retraction of the cargo lowering slide assembly to or from the vehicle. The sensing of unexpected and/or sudden change in current draw from a motor alerts the system to halt operation of the cargo lowering slide assembly for a predetermined period of time, or until additional user input is provided to reinitiate actuation of motors to deploy or stow the cargo lowering slide assembly.

Certain embodiments of a cargo lowering slide assembly, shown in FIG. 16A-FIG. 16C, employ sensors in order to determine the configuration in a fully stowed configuration 1601, fully extended configuration or raised configuration 1602, a fully deployed or lowered configuration 1603, and various configurations therebetween. An exemplary sensor 1950 is shown in FIG. 20. Such sensors include, but are not limited to, stop-limit switches, magnetic proximity sensors, and motor encoders. Such sensors allow the sensing of when the cargo lowering slide assembly reaches predetermined configurations such as a fully stowed, fully extended, and fully deployed configurations. Furthermore, such sensors provide and communicate information to the controller 1605 (FIG. 16A) surrounding the status of a motor, which relates to the position of certain aspects of the system. In certain embodiments, a motor encoder incorporated with a motor communicates the radial travel of a motor, which translates to an extension distance of a slide assembly, or the extension distance of a lowering assembly. In other embodiments, an encoder 1905 interconnected to a first motor 1855 of a cable lift assembly (FIG. 19) and an encoder interconnected to a second lowering motor, may be compared continuously or periodically in order to ensure the lowering assembly is raised and lowered in a manner to keep a cargo platform 150 level.

Figure 21A:
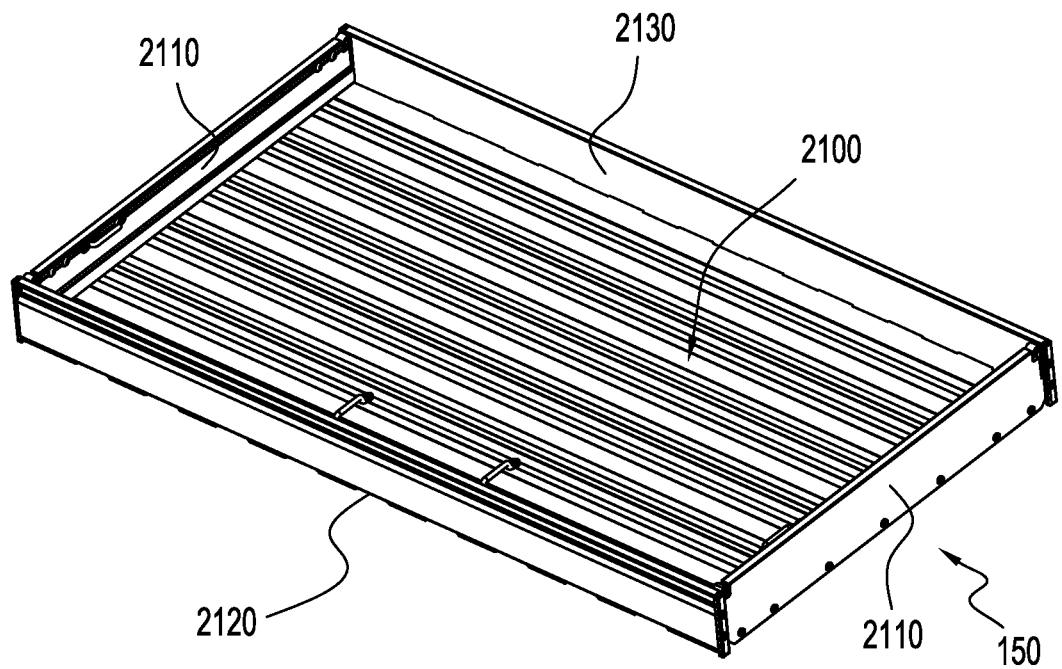
FIG. 21A—depicts certain embodiments of the cargo platform.
Figure 21B:
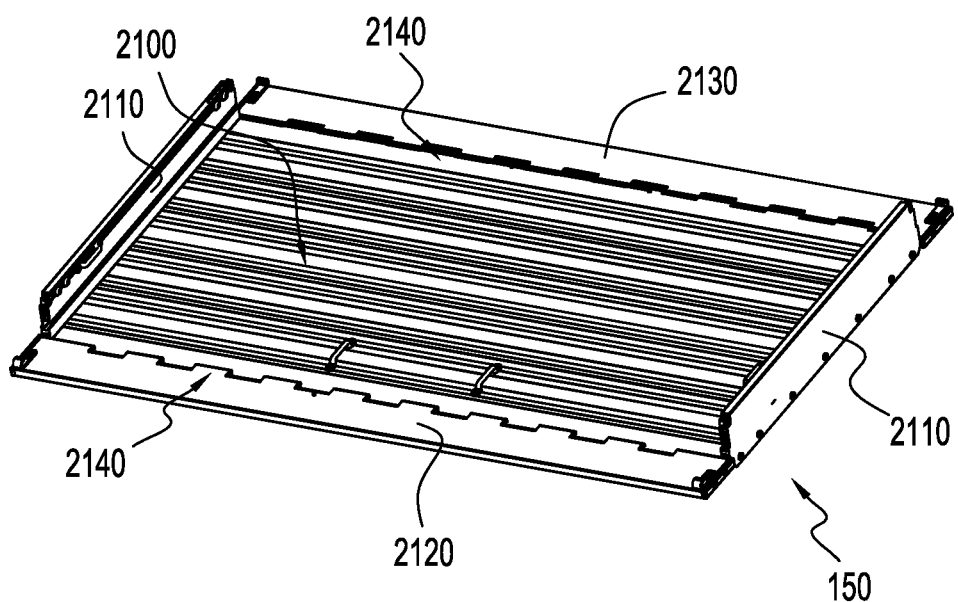
FIG. 21B—depicts certain embodiments of the cargo platform.

Certain embodiments, as shown in FIGS. 21A and 21B, include a cargo platform 150. The cargo platform comprises a floor 2100, opposing side walls 2110, a front wall 2120, and a back wall 2130. In certain embodiments, the opposing side walls 2110 are rigidly interconnected to the floor 2100. In certain embodiments, as shown in FIG. 21B, the front wall 2120 and/or the back wall 2130 are interconnected to the floor 2100 by a hinged connection 2140. The hinged connection 2140 allows the front wall 2120 and/or the back wall 2130 to be lowered so that equipment and the like can be wheeled on or off the cargo platform 150.

The structural materials employed advantageously in the present invention are fashioned from machined plastics, extruded, machined, or cast aluminum or stainless steel, and although several suitable alternatives are available, as one skilled in the art would recognize readily. Likewise, any padding, where padding is desirable, is preferably some kind of foamed elastomer, though other suitable materials exist. Other hardware, brackets, locking pins and supports may be fashioned from aluminum, stainless steel, brass, or other suitable material. One of ordinary skill in the art will appreciate that embodiments of the present disclosure may be constructed of materials known to provide, or predictably manufactured to provide the various aspects of the present disclosure. These materials may include, for example, stainless steel, titanium alloy, aluminum alloy, chromium alloy, and other metals or metal alloys. These materials may also include, for example, carbon fiber, ABS plastic, polyurethane, and other fiber-encased resinous materials, synthetic materials, polymers, and natural materials. The system and its elements could be flexible, semi-rigid, or rigid and made of materials such as stainless steel, titanium alloy, aluminum alloy, chromium alloy, and other metals or metal alloys, carbon fiber, ABS plastic, polyurethane, and other fiber-encased resinous materials, synthetic materials, polymers, and natural materials. In certain embodiments, some or all components are manufactured by way of 3-D printing.

The exemplary systems and methods of this disclosure have been described in relation to firetrucks and rescue vehicles and associated operations. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration.

Moreover, though the Description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While various embodiments of the present invention have been described in detail, it is apparent that modifications and alterations of those embodiments will occur to those skilled in the art. However, it is to be expressly understood that such modifications and alterations are within the scope and spirit of the present invention. Further, the inventions described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A cargo lowering slide assembly comprising:
    a first slide assembly having at least a first slide rail and a second slide rail, the second slide rail interconnected and substantially parallel to the first slide rail, wherein the second slide rail is configured to slidably extend and retract longitudinally in relation to the first slide rail;
    a first rack gear interconnected with the second slide rail;
    a first motor assembly interconnected to the first slide rail comprising a first pinion gear adapted to intermesh with the rack gear, wherein rotation of the pinion gear in a first direction extends first slide assembly toward an extended position and wherein rotation of the pinion gear in a second direction retracts first slide assembly toward a retracted configuration;
    a first scissor lift assembly having a first end comprising a pivoting connection and a sliding connection with the first slide assembly;
    the first scissor lift assembly comprising a second end having a pivoting connection and a sliding connection with a cargo platform;
    a first cable lift assembly interconnected to the first slide assembly, the first cable lift assembly comprising a drum having a longitudinal axis substantially parallel to the direction of travel of the first slide assembly;
    the first cable lift assembly further comprising a cable interconnected with the drum and interconnected with the scissor lift assembly or the cargo platform, wherein rotation of the drum in a first direction lowers the cargo platform toward a lowered configuration, and wherein rotation of the drum in a second direction raises the cargo platform toward a raised configuration; and
    wherein the first motor assembly is adapted to allow manual extension or retraction of the cargo platform.

2. The cargo lowering slide assembly of claim 1, wherein the first slide assembly further comprises a third slide rail interconnected with and substantially parallel to the second slide rail, and wherein the third slide rail is configured to slidably extend and retract longitudinally in relation to the second slide rail.

3. The cargo lowering slide assembly of claim 2, wherein the first scissor lift assembly and the first cable lift assembly are interconnected to the third slide rail.

4. The cargo lowering slide assembly of claim 3, wherein the second slide rail further comprises a spur gear assembly, the spur gear assembly comprising at least a first spur drive gear intermeshed with a rack gear of the first slide rail, and a rack gear of the third slide rail, and wherein extension of the second slide rail in relation of the first slide rail results in extension of the third slide rail in relation to the second slide rail, and wherein retraction of the second slide rail in relation to the first slide rail results in retraction of the third slide rail in relation to the second slide rail.

5. The cargo lowering slide assembly of claim 4, wherein the spur gear assembly comprises:
    a first spur drive gear which is intermeshed with the rack gear of the first slide rail;
    a second spur drive gear intermeshed with the rack gear of the third slide rail;
    a first distal spur gear axially interconnected with the first spur drive gear;
    a second distal spur gear axially interconnected with the second spur drive gear; and
    an odd number of spur gears intermeshed between the first distal spur gear and the second distal spur gear;
    wherein rotation of the first spur drive gear rotates the first distal spur gear, rotates the odd number of spur gears, rotates the second distal spur gear, and thereby rotates the second spur drive gear.

6. The cargo lowering slide assembly of claim 5 wherein the odd number of spur gears comprises three or five spur gears.

7. The cargo lowering slide assembly of claim 5, wherein the cable further comprises:
   a first end interconnected to the drum;
   a second end interconnected to the third slide rail; and
   an intermediate aspect therebetween configured to interface with the cargo platform.

8. The cargo lowering device of claim 7, wherein the pivoting connection with the cargo platform comprises a bearing wherein the intermediate aspect of the cable interfaces with the bearing.

9. The cargo lowering slide assembly of claim 3, wherein the cable further comprises:
   a first end interconnected to the drum;
   a second end interconnected to the third slide rail; and
   an intermediate aspect therebetween.

10. The cargo lowering device of claim 9, wherein the first scissor lift assembly comprises a first scissor arm and a second scissor arm interconnected at a pivoting bearing connection, wherein the intermediate aspect of the cable interfaces with the bearing connection.

11. The cargo lowering device of claim 1, further comprising:
   a first rotary encoder assembly interconnected to the first motor assembly;
   a second rotary encoder assembly interconnected to the first cable lift assembly;
   wherein the first and second rotatory encoder assemblies are adapted to communicate with a controller;
   wherein the controller is adapted to monitor the first and second rotatory encoder assemblies in order to determine the position of the cargo platform.

12. The cargo lowering device of claim 11, wherein the controller is adapted to monitor the second rotatory encoder assembly in order to maintain the cargo platform in a level condition during raising or lowering.

13. The cargo lowering device of claim 11, wherein the cargo lowering device is interconnected with an enclosure comprising a door, further comprising:
   a first sensor configured to detect the open position of the door and communicate with the controller;
   wherein the controller restricts longitudinal extension and retraction of the first slide assembly when the first sensor does not communicate an open position of the door.

14. The cargo lowering device of claim 1, wherein the cargo lowering device is interconnected with an enclosure comprising a door, further comprising:
   a first sensor configured to detect an open configuration of the door and communicate with a controller;
   wherein the controller is adapted to permit longitudinal extension and retraction of the first slide assembly when the first sensor communicates an open configuration of the door; and
   wherein the controller is adapted to restrict longitudinal extension and retraction of the first slide assembly when the first sensor does not communicate an open configuration of the door.

15. The cargo lowering device of claim 1, further comprising:
   a first sensor interconnected with the first slide assembly, the first sensor configured to detect a fully extended configuration of the first slide assembly, and the first sensor adapted to communicate with a controller;
   a second sensor interconnected with the first scissor lift assembly, the second sensor configured to detect a fully raised configuration of the first scissor lift assembly, and the second sensor adapted to communicate with the controller;
   wherein the controller is adapted to permit raising and lowering of the first scissor lift assembly when the first sensor communicates a fully extended configuration of the first slide assembly;
   wherein the controller is adapted to restrict raising and lowering of the first scissor lift assembly when the first sensor does not communicate a fully extended configuration of the first slide assembly;
   wherein the controller is adapted to permit longitudinal retraction of the first slide assembly when the second sensor communicates a fully raised configuration of the first scissor lift assembly; and
   wherein the controller is adapted to restrict longitudinal retraction of the first slide assembly when the second sensor does not communicate a fully raised configuration of the first scissor lift assembly.

* * * * *